United States Patent
Roudebush et al.

(10) Patent No.: US 12,409,642 B2
(45) Date of Patent: Sep. 9, 2025

(54) TUNGSTEN OXIDE NANOSTRUCTURE THIN FILMS FOR ELECTROCHROMIC DEVICES

(71) Applicant: HALIO, INC., Hayward, CA (US)

(72) Inventors: John H. Roudebush, Hayward, CA (US); Lina Zhu, Hayward, CA (US); Daniel Giaquinta, Hayward, CA (US); Hugues Duncan, Hayward, CA (US); Howard Turner, Hayward, CA (US)

(73) Assignee: SMART WINDOW INC., LIMITED, Kowloon (HK)

( * ) Notice: Subject to any disclaimer, the term of this patent is extended or adjusted under 35 U.S.C. 154(b) by 88 days.

(21) Appl. No.: 18/330,960

(22) Filed: Jun. 7, 2023

(65) Prior Publication Data

US 2023/0311463 A1 Oct. 5, 2023

Related U.S. Application Data

(63) Continuation of application No. 16/786,900, filed on Feb. 10, 2020, now Pat. No. 11,697,275, which is a
(Continued)

(51) Int. Cl.
*G02F 1/1524* (2019.01)
*B05D 1/26* (2006.01)
(Continued)

(52) U.S. Cl.
CPC ............. *B32B 27/16* (2013.01); *B05D 1/265* (2013.01); *B32B 5/16* (2013.01); *B32B 9/005* (2013.01);
(Continued)

(58) Field of Classification Search
CPC ........... B32B 27/16; B32B 5/16; B32B 9/005; B32B 9/045; B32B 23/12; B32B 27/14; B32B 27/281; B32B 27/285; B32B 27/286; B32B 27/306; B32B 27/308; B32B 27/32; B32B 27/36; B32B 27/365; B32B 27/40; B32B 2250/05; B32B 2250/40; B32B 2255/10; B32B 2255/20; B32B 2255/205; B32B 2264/102; B32B 2307/20;
(Continued)

(56) References Cited

U.S. PATENT DOCUMENTS 6,178,034 B1 * 1/2001 Allemand ............. G02F 1/1503
359/269
2007/0097480 A1 * 5/2007 Yang ..................... G02F 1/1524
359/265
(Continued)

FOREIGN PATENT DOCUMENTS

CN 103395842 A * 11/2013
JP H09229888 A 9/1997
JP 2009001441 A 1/2009

*Primary Examiner* — Tuyen Tra

(57) ABSTRACT

A method of manufacturing a thin film is provided. The method includes providing a plurality of crystalline hexagonal tungsten trioxide particles, size-reducing the crystalline hexagonal tungsten trioxide particles by grinding to produce crystalline hexagonal tungsten trioxide nanostructures, and coating the crystalline hexagonal tungsten trioxide nanostructures onto a substrate to produce a thin film. An electrochromic multi-layer stack is also provided.

19 Claims, 12 Drawing Sheets

Related U.S. Application Data continuation of application No. 15/818,566, filed on Nov. 20, 2017, now Pat. No. 10,558,103, which is a continuation of application No. 15/009,465, filed on Jan. 28, 2016, now Pat. No. 9,823,535.

(60) Provisional application No. 62/250,394, filed on Nov. 3, 2015, provisional application No. 62/108,969, filed on Jan. 28, 2015.

(51) Int. Cl.

| | |
|---|---|
| *B32B 5/16* | (2006.01) |
| *B32B 9/00* | (2006.01) |
| *B32B 9/04* | (2006.01) |
| *B32B 23/12* | (2006.01) |
| *B32B 27/14* | (2006.01) |
| *B32B 27/16* | (2006.01) |
| *B32B 27/28* | (2006.01) |
| *B32B 27/30* | (2006.01) |
| *B32B 27/32* | (2006.01) |
| *B32B 27/36* | (2006.01) |
| *B32B 27/40* | (2006.01) |
| *C01G 41/02* | (2006.01) |
| *C03C 17/34* | (2006.01) |
| *G02F 1/153* | (2006.01) |
| *G02F 1/155* | (2006.01) |

(52) U.S. Cl.
CPC .............. *B32B 9/045* (2013.01); *B32B 23/12* (2013.01); *B32B 27/14* (2013.01); *B32B 27/281* (2013.01); *B32B 27/285* (2013.01); *B32B 27/286* (2013.01); *B32B 27/306* (2013.01); *B32B 27/308* (2013.01); *B32B 27/32* (2013.01); *B32B 27/36* (2013.01); *B32B 27/365* (2013.01); *B32B 27/40* (2013.01); *C01G 41/02* (2013.01); *C03C 17/3417* (2013.01); *G02F 1/1524* (2019.01); *G02F 1/153* (2013.01); *B32B 2250/05* (2013.01); *B32B 2250/40* (2013.01); *B32B 2255/10* (2013.01); *B32B 2255/20* (2013.01); *B32B 2255/205* (2013.01); *B32B 2264/102* (2013.01); *B32B 2307/20* (2013.01); *B32B 2307/40* (2013.01); *B32B 2307/402* (2013.01); *B32B 2307/412* (2013.01); *B32B 2551/08* (2013.01); *B32B 2605/006* (2013.01); *G02F 1/155* (2013.01); *G02F 2202/36* (2013.01)

(58) Field of Classification Search
CPC .......... B32B 2307/40; B32B 2307/402; B32B 2307/412; B32B 2551/08; B32B 2605/006; B05D 1/265; C01G 41/02; C03C 17/3417; G02F 1/1524; G02F 1/153; G02F 1/155; G02F 2202/36
See application file for complete search history.

(56) References Cited

U.S. PATENT DOCUMENTS

| | | |
|---|---|---|
| 2016/0336622 A1 | 11/2016 | Zhang |
| 2020/0174334 A1 | 6/2020 | Roudebush et al. |

\* cited by examiner

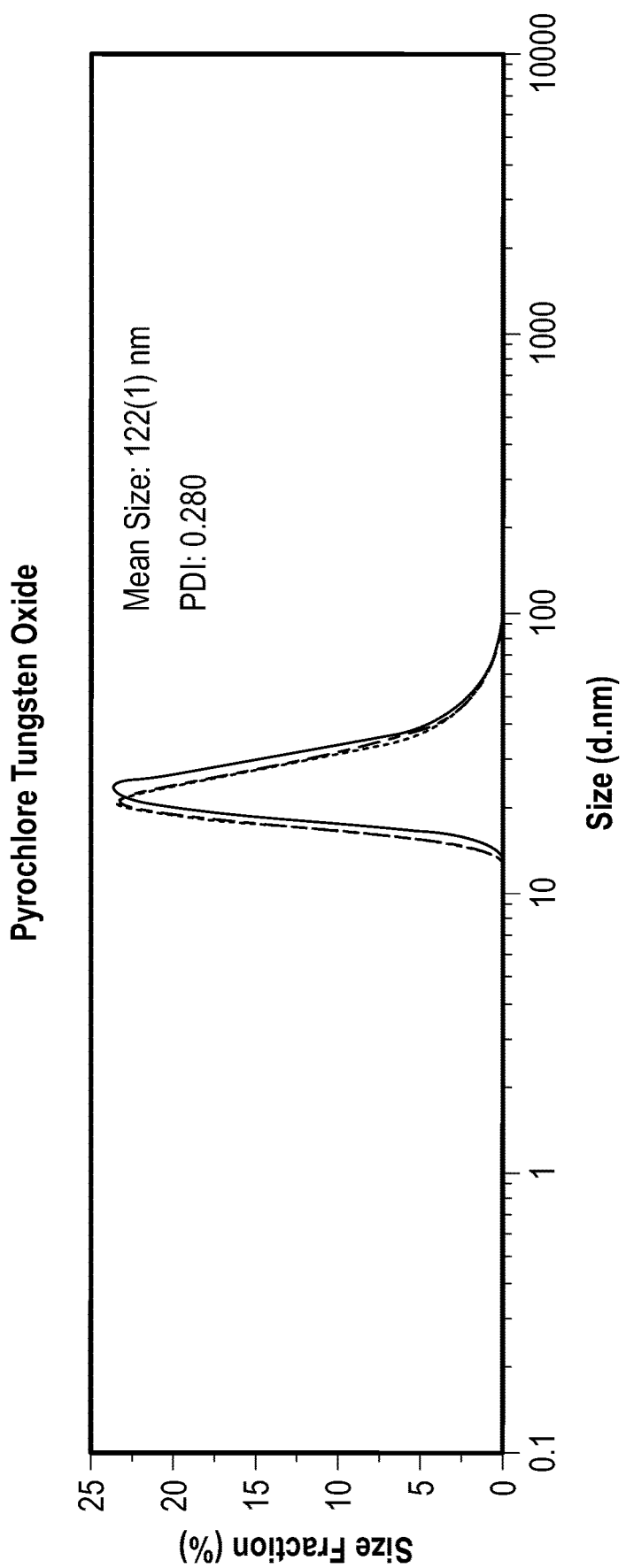

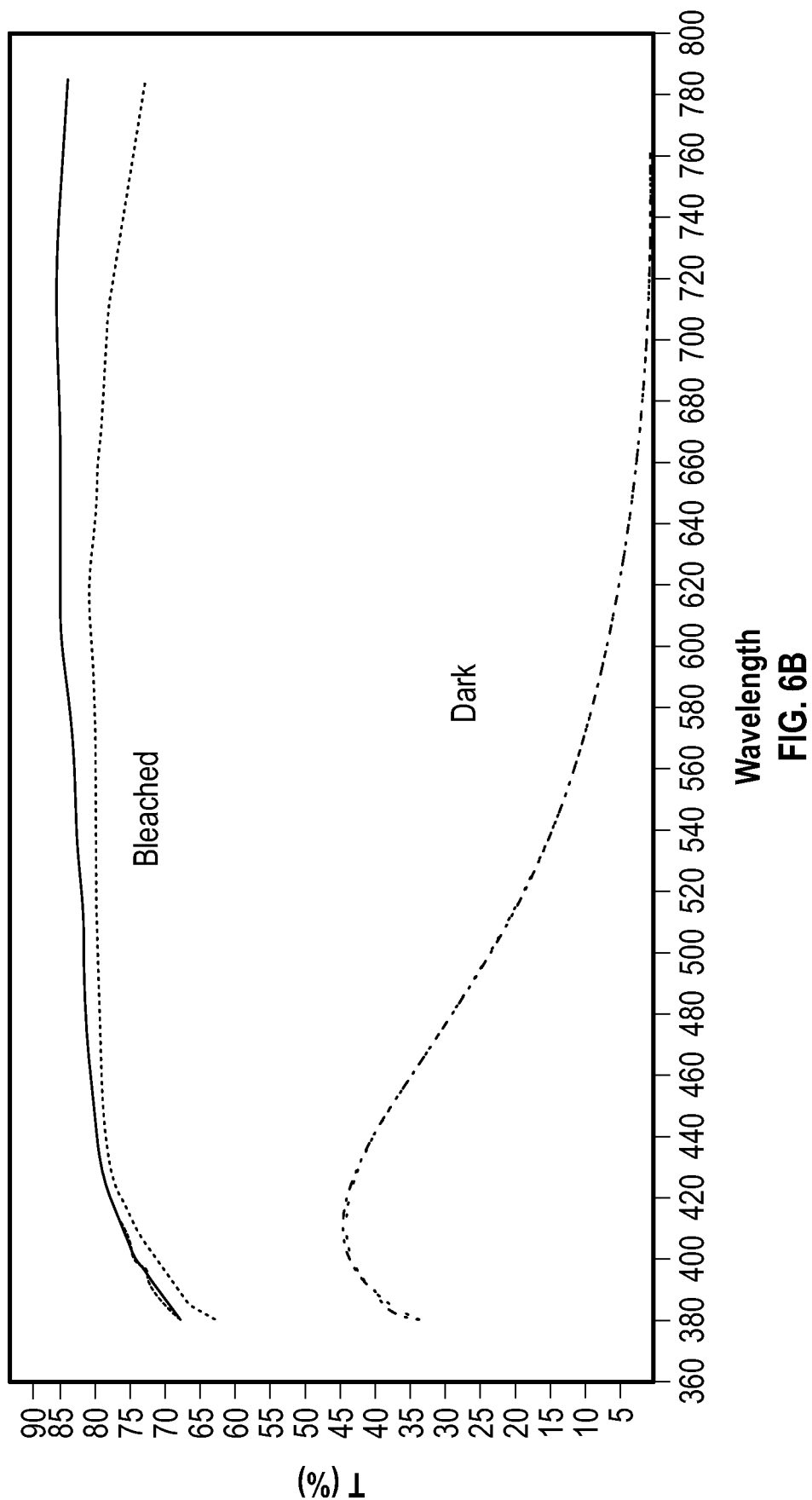

TUNGSTEN OXIDE NANOSTRUCTURE THIN FILMS FOR ELECTROCHROMIC DEVICES

FIELD OF INVENTION

The present disclosure generally relates to thin films of tungsten oxide and tungsten trioxide nanostructures and the substituted versions of each and methods for preparing the nanostructures, thin films, electrochromic multi-layer stacks and electrochromic devices. This disclosure also relates to the different phases of tungsten oxide or trioxide nanostructures including monoclinic, triclinic, orthorhombic, tetragonal, and hexagonal.

BACKGROUND

Tungsten oxide materials are useful for their electrochemical and electrochromic behavior, and they are widely used in electrochromic devices. There are a number of different deposition techniques and polymorphs of tungsten oxide that have been used in electrochromic devices. Amorphous tungsten trioxide deposited by either thermal evaporation or sol-gel methods, is often used for electrochromic applications although crystalline tungsten trioxide is also used.

Commercial switchable glazing devices, also commonly known as smart windows and electrochromic (EC) window devices, are well known for use as mirrors in motor vehicles, aircraft window assemblies, sunroofs, skylights, and architectural windows. Such devices may comprise, for example, active inorganic electrochromic layers, organic electrochromic layers, inorganic ion-conducting layers, organic ion conducting layers and hybrids of these sandwiched between two conducting layers. When a voltage is applied across these conducting layers the optical properties of a layer or layers in between change. Such optical property changes typically include a modulation of the transmissivity of the visible portion or the solar sub-portion of the electromagnetic spectrum. For convenience, the two optical states will be referred to as a bleached state and a darkened state in the present disclosure, but it should be understood that these are merely examples and relative terms (i.e., a first one of the two states is more transmissive or "more bleached" than the other state and the other of the two states is less transmissive or "more darkened" than the first state) and that there could be a set of bleached and darkened states between the most transmissive state and the least transmissive state that are attainable for a specific electrochromic device; for example, it is feasible to switch between intermediate bleached and darkened states in such a set.

The broad adoption of electrochromic window devices in the construction and automotive industries will require a ready supply of low cost, aesthetically appealing, durable products in large area formats. Electrochromic window devices based on metal oxides represent the most promising technology for these needs. Typically, such devices comprise two electrochromic materials (a cathode and an anode) separated by an ion-conducting film and sandwiched between two transparent conducting oxide (TCO) layers. In operation, a voltage is applied across the device that causes current to flow in the external circuit, oxidation and reduction of the electrode materials and, to maintain charge balance, mobile cations to enter or leave the electrodes. This facile electrochemical process causes the window to reversibly change from a more bleached (e.g., a relatively greater optical transmissivity) to a more darkened state (e.g., a relatively lesser optical transmissivity).

Electrochromic devices may utilize a combination of two types of electrochromic materials, one of which becomes optically less transmissive (e.g., takes on color) in its electrochemically oxidized state while the other becomes optically less transmissive (e.g., takes on color) in its electrochemically reduced state. Such a device where both anodic and cathodic electrochromic materials can simultaneously darken or bleach may be called a complementary electrochromic device. For example, Prussian blue assumes a blue color in its electrochemically oxidized state and becomes colorless by reduction while tungsten trioxide (i.e., $WO_3$), assumes a blue color in its electrochemically reduced state and becomes colorless by oxidation. When the two are used as separate electrochromic layers separated by an ion conductor layer in a multi-layer stack, the stack may be reversibly cycled between a blue color (when the Prussian blue material is in its electrochemically oxidized state and tungsten trioxide is in its reduced state) and a transparent state (when the Prussian blue material is in its electrochemically reduced state and tungsten trioxide is in its electrochemically oxidized state) by application of an appropriate voltage across the stack.

For convenience of description herein, change of these one or more optical properties of electrochromic devices (i.e., switching or cycling of the electrochromic devices) is primarily discussed as occurring between a pair of optical states (i.e., an optically less transmissive state and an optically more transmissive state), but it should be understood that these are merely examples and relative terms. For example, the optically less and more transmissive states can be a pair of optical states between a pair of more extreme optically less and more transmissive states that are attainable by a specific electrochromic device. Further, there could be any number of optical states between the optically less and more transmissive states.

Tungsten oxides are well-known electrochemically active materials. Uncertainty exists in the literature, however, regarding whether crystalline or amorphous materials are preferred. In addition, while tungsten trioxide ($WO_3$) crystallizes in several polymorphs, there is no clear preference as to which polymorph is best, or whether demonstrable differences should be expected. Crystallinity, the degree of crystallinity, and the crystal system obtained varies with synthesis method, temperature, the use of additives and other considerations.

Some electrochromic systems in prior art literature have studied amorphous $WO_3$ prepared by physical vapor deposition (PVD). Many examples in the PVD literature teach that crystalline $WO_3$ is detrimental for EC performance. Crystalline $WO_3$ in these studies tends to be deposited onto a hot substrate, or crystallized from an amorphous deposition, and is most often of monoclinic symmetry.

In addition to thermal evaporation, $WO_3$ can be deposited by a number of other methods, such as sol-gel, electrodeposition and hydrothermal synthesis. Different deposition methods can be used to prepare $WO_3$ films with different crystal structures. While not every polymorph may be prepared in a straightforward manner, methods for the synthesis of each are known.

$WO_3$ may be prepared from sol-gel methods requiring expensive precursors and organic solvents. These reagents contain significant amounts of carbon from their (often) alkoxide ligands and this carbon must be removed later in the process, often using elevated temperatures. In addition, some $WO_3$ film deposition methods require the use of binders and templating agents to facilitate the synthesis of different polymorphs of $WO_3$ and/or impart robust mechanical properties to the deposited films. These binders and templating agents remain in the film after deposition diluting the active material in the film, and/or require complex processing conditions to remove.

The prior art has shown the deposition of crystalline $WO_3$ films that require high temperature treatments of the films on the substrate. One deposition method is hot wire chemical vapor deposition to form $WO_3$ nanoparticles followed by electrophoretic deposition of a film, and another deposition method was thermal evaporation. Both techniques used required a post-deposition anneal at 300-400° C. for 2 hours to form the intended crystalline films. These techniques requiring high temperature post-deposition annealing are not feasible for films formed on substrates that can be altered or melt at those temperatures.

Crystalline tungsten trioxide films can be deposited directly on a substrate using techniques such as thermal evaporation or sol-gel methods with annealing. Sol-gel methods require high temperatures after deposition to create crystalline tungsten trioxide films with the most desirable electrochromic properties. Crystalline hexagonal tungsten trioxide nanostructures (e.g. nanowires and/or nanoparticles) can be grown on tungsten trioxide seed layers as well. Physical vapor deposited (e.g., evaporated or sputtered) films are typically amorphous as-deposited unless the substrate is heated, and may also thus require thermal treatments to crystallize the films after deposition. The high temperatures required to crystallize an as-deposited amorphous film produced by physical vapor deposition to form crystalline tungsten trioxide are incompatible with substrates with low melting points (e.g. flexible polymer substrates). The high temperatures and environments required for post-deposition annealing also require more expensive equipment. Additionally, some processing temperatures required for the crystallization of certain tungsten trioxide polymorphs can reach as high as 900° C., which precludes the use of glass substrates if the material is deposited directly onto the substrate before the crystallization step. These techniques all have drawbacks in manufacturing compared to hydrothermal synthesis of crystalline tungsten trioxide particles, followed by size-reduction and coating, especially when targeting crystalline particles of a specific symmetry or structure.

One of the crystal phases of $WO_3$ that has been studied by certain processing techniques is hexagonal $WO_3$ (i.e., $h$-$WO_3$). There are some examples of hexagonal $WO_3$ (i.e. $h$-$WO_3$) for battery (i.e. electrochemical) and EC applications in the prior art. Commonly utilized synthetic methods such as PVD and electrodeposition, however, are not always amenable to the preparation of single phase, crystalline $h$-$WO_3$. Instead, $h$-$WO_3$ has been produced via hydrothermal synthesis, growing nanostructures directly on substrates, and producing nanostructures in solution.

Other crystal phases of $WO_3$ have other symmetries and may be described as triclinic $WO_3$ or monoclinic $WO_3$ or cubic $WO_3$, as is appropriate based on their symmetries. In general, if the arrangement of the atoms in the crystal phase are similar but differ in symmetry, the crystal phase may be described strictly by its symmetry. In certain circumstances, however, the arrangement of the atoms in the crystal phase may be unique beyond simple distortions that alter the lattice symmetry. In such cases, the use of structure types in addition to a symmetry descriptor is useful Tungsten oxide thus may be described as displaying a number of polymorphs. The term "polymorph" is here intended to comprise symmetry changes that largely maintain some or all of the same atomic connectivity and unique relationships of atoms that produce unique structural features. Sometimes, however, polymorph may describe an entirely different structure and atomic arrangement but with the same composition. Critically, the synthesis and/or thin film deposition method can impact the resulting polymorph. For instance, thermally evaporated tungsten oxide is typically amorphous especially if the substrate is not heated. The resulting films can be crystallized by post-deposition annealing (e.g., in air), however, the resulting crystal structure of the tungsten trioxide so produced is typically monoclinic perovskite. Monoclinic perovskite tungsten oxide is known to undergo phase transformations upon intercalation (e.g. with Li). [Nonstoichiometric Compounds; Ward, R.; Advances in Chemistry; Chapter 23, pp 246-253, American Chemical Society: Washington, D C, 1963.] Examples of tungsten trioxide materials that typically occur in different structures are sol-gel prepared materials and commercially available nanostructured materials which typically have the "Perovskite Tungsten Bronze" [or PTB] structure. The PTB structure may be described as similar to $ReO_3$ in which metal (M) ions (usually monovalent) are intercalated into interstitial spaces of the $ReO_3$ structure resulting in $M_xReO_3$ and the perovskite structure type. Also, it is well known in the literature that thermally evaporated films that have subsequently been crystallized by annealing show worse durability than the amorphous tungsten trioxide thermally evaporated films in electrochromic devices.

Another polymorph of $WO_3$ is the cubic pyrochlore. Sometimes the stoichiometry is represented with waters of hydration and sometimes with hydroxides. Sometimes the stoichiometry is represented with counter ions and sometimes the stoichiometry is doubled, e.g. $[-]W_2O_6$. For simplicity, the pyrochlore phase will be described here as part of the $WO_3$ series and explained as a substituted $WO_3$ when additional metals are present.

The film deposition approaches of many crystalline tungsten oxide polymorphs have limitations. For example, $h$-$WO_3$ nanowires formed by hydrothermal synthesis directly on substrates required a 400° C. pretreatment step to form a $WO_3$ seed layer. This pretreatment step is not compatible with many low temperature substrates. Additionally, these films had poor mechanical properties, such as low adhesion to the underlying substrate. Hexagonal-$WO_3$ nanostructures have also been produced in solution, but have either not been deposited into films (i.e. characterized as a colloidal dispersion only), or were deposited in a composite film using conductive carbon and binders (to address improving the mechanical properties, such as adhesion).

What is therefore desired are crystalline tungsten oxide electrochromic materials capable of forming films and devices on a variety of substrates, and methods for producing the same. Furthermore, an electrochromic device with crystalline tungsten oxide and methods for producing the same, with improved device durability, is also desirable. It is within this context that the embodiments arise.

BRIEF DESCRIPTION OF THE DRAWINGS

To facilitate further description of the embodiments, the following drawings are provided in which:

FIG. 5b illustrates a particle size distribution of pyrochlore tungsten oxide slurries after size-reduction by grinding.

FIG. 6b illustrates the % transmission vs. wavelength spectra of a pyrochlore tungsten oxide film in the bleached and darkened states.

Figure 1:
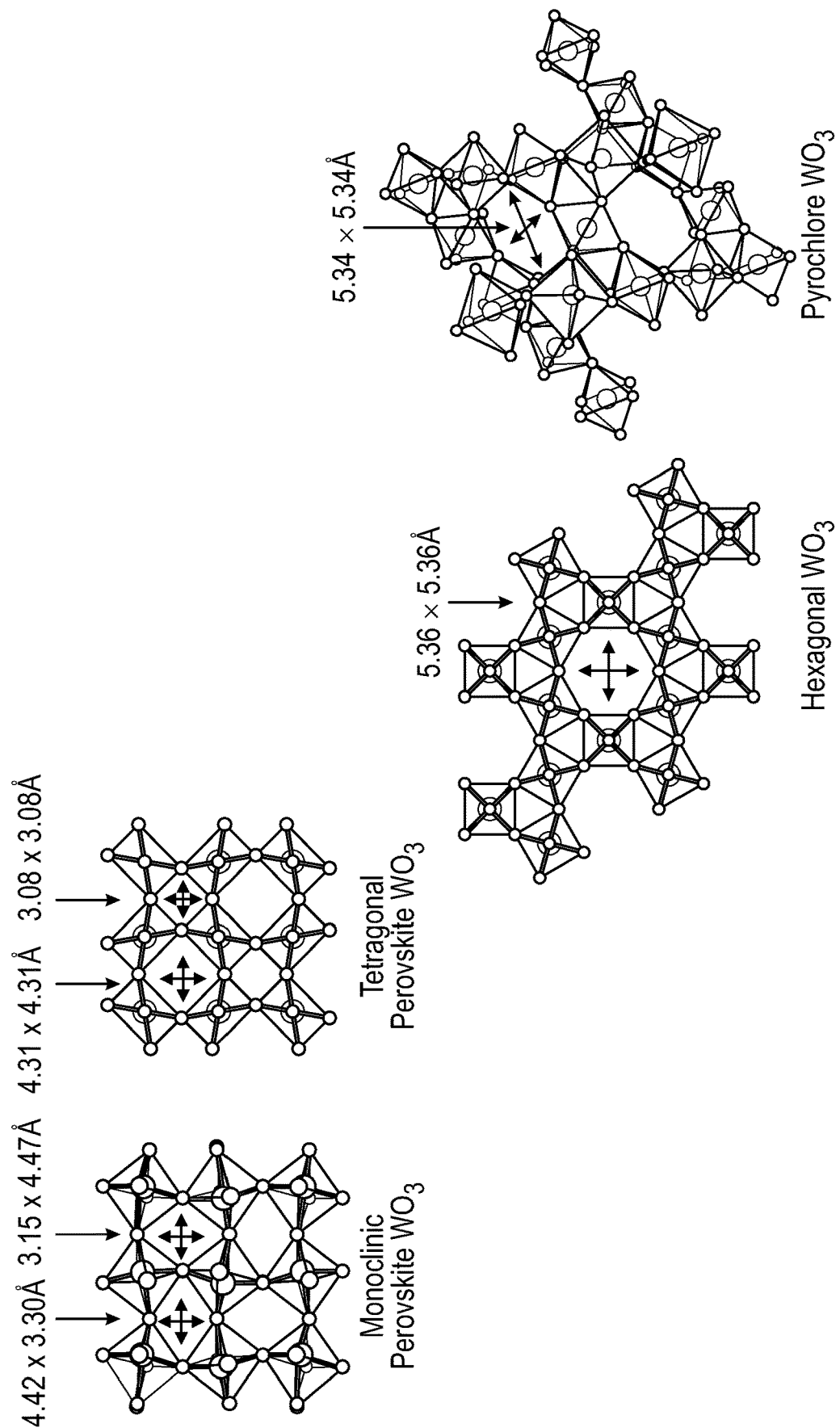
FIG. 1 illustrates four different polymorphs of tungsten trioxide: monoclinic perovskite, tetragonal perovskite, hexagonal and pyrochlore including the approximate interstitial dimensions.

Corresponding reference characters indicate corresponding parts throughout the drawings. Additionally, relative thicknesses of the layers in the different figures do not represent the true relationship in dimensions. For example in FIG. 2, the substrates are typically much thicker than the other layers. Unless otherwise noted, the figures are drawn only to illustrate connection principles, not to give any dimensional information.

ABBREVIATIONS AND DEFINITIONS

The following definitions are provided to better define the embodiments of the present disclosure and to guide those of ordinary skill in the art in the practice of the present disclosure. Unless otherwise noted, terms are to be understood according to conventional usage by those of ordinary skill in the relevant art.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that an activity, process, method, system, article, device, or apparatus that comprises a list of elements is not necessarily limited to those elements, but may include other elements not expressly listed or inherent to such activity, process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the disclosure described herein are, for example, capable of operation in other orientations than those illustrated or otherwise described herein.

The terms "couple," "coupled," "couples," "coupling," and the like should be broadly understood and refer to connecting two or more elements or signals, electrically, ionically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time (e.g., permanent or semi-permanent or only for an instant).

"Electrical coupling" and the like should be broadly understood and include coupling involving any electrical signal, whether a power signal, a data signal, and/or other types or combinations of electrical signals.

"Ionic coupling" and the like should be broadly understood and include coupling involving or permitting the transfer of ions between discrete layers or compositions.

"Mechanical coupling" and the like should be broadly understood and include mechanical coupling of all types.

The absence of the word "removably," "removable," and the like near the word "coupled," and the like does not mean that the coupling, etc. in question is or is not removable.

The terms "anodic electrochromic layer" and "anodic electrochromic material" refer to an electrode layer or electrode material, respectively, that upon the removal of ions and electrons becomes less transmissive to electromagnetic radiation.

The term "bleach" refers to the transition of an electrochromic material from a first optical state to a second optical state wherein the first optical state is less transmissive than the second optical state.

The term "bleached state voltage" refers to the open circuit voltage ($V_{oc}$) of the anodic electrochromic layer versus Li/Li+ in an electrochemical cell in a propylene carbonate solution containing 1M lithium perchlorate when the transmissivity of said layer is at 95% of its "fully bleached state" transmissivity.

The terms "cathodic electrochromic layer" and "cathodic electrochromic material" refer to an electrode layer or electrode material, respectively, that upon the insertion of ions and electrons becomes less transmissive to electromagnetic radiation.

The term "coloration efficiency" or "CE" refers to a property of an electrochromic layer that quantifies how a layer's optical density changes as a function of its state of charge. CE can vary significantly depending on layer preparation due to differences in structure, material phases, and/or composition. These differences affect the probability of electronic transitions that are manifest as color. As such, CE is a sensitive and quantitative descriptor of an electrochromic layer encompassing the ensemble of the identity of the redox centers, their local environments, and their relative ratios. CE is calculated from the ratio of the change in optical absorbance to the amount of charge density passed.

In the absence of significant changes in reflectivity, this wavelength dependent property can be measured over a transition of interest using the following equation:

$$CE_\lambda = \frac{\log_{10}\left(\frac{T_{ini}}{T_{final}}\right)}{Q_A}$$

where $Q_A$ is the charge per area passed, $T_{ini}$ is the initial transmission, and $T_{final}$ is the final transmission. For anodically coloring layers this value is negative, and may also be stated in absolute (non-negative) values. A simple electro-optical setup that simultaneously measures transmission and charge can be used to measure CE. Alternatively, the end transmission states can be measured ex situ before and after electrical switching. CE is sometimes alternatively reported on a natural log basis, in which case the reported values are approximately 2.3 times larger.

The term "darken" refers to the transition of an electrochromic material from a first optical state to a second optical state wherein the first optical state is more transmissive than the second optical state.

The term "electrochromic material" refers to materials that change in transmissivity to electromagnetic radiation, reversibly, as a result of the insertion or extraction of ions and electrons. For example, an electrochromic material may change between a colored, translucent state and/or a transparent state.

The term "electrochromic layer" refers to a layer comprising an electrochromic material.

The term "electrode layer" refers to a layer capable of conducting ions as well as electrons. The electrode layer contains a species that can be reduced when ions are inserted into the material and contains a species that can be oxidized when ions are extracted from the layer. This change in oxidation state of a species in the electrode layer is responsible for the change in optical properties in the device.

The term "electrical potential," or simply "potential," refers to the voltage occurring across a device comprising an electrode/ion conductor/electrode assembly.

The term "electrochemically matched" refers to a set of cathode and anode electrochromic films or materials with similar charge capacities and complementary oxidation states such that when joined together by a suitable ion-conducting and electrically insulating layer, a functional electrochromic device is formed that shows reversible switching behavior over a substantial range of the theoretical charge capacities of the films or materials, respectively.

The term "fully bleached state" as used in connection with an anodic electrochromic material refers to the state of maximum transmissivity of an anodic electrochromic layer in an electrochemical cell at or above 1.5V versus Li/Li+ in a propylene carbonate solution containing 1 M lithium perchlorate at 25° C. (under anhydrous conditions and in an Ar atmosphere).

The term "inorganic electrochromic film" or "inorganic electrochromic material" as used herein comprises a film or material, respectively, comprising metals that undergo reversible oxidation and reduction reactions during the cycling of an electrochromic device. Inorganic electrochromic materials and films lack solubility in common organic and neutral aqueous solvents, and typically possess a 3-dimensional structure where the metal ions are bridged to and share counter anions such as oxide, sulfide, nitride and halide, or complex molecular inorganic anions such as silicate, borate, phosphate or sulfate. Electrochromic films comprising metal ions and carbon-containing counter anions in a 3-dimensional lattice are also known. Examples include Prussian blue and Prussian blue analogues, nitroprusside compounds and other metal-organic framework compounds comprising metal ions and cyanide anions or other anions similar to cyanide. These systems may also be referred to as organometallic electrochromic materials.

The term "transmissivity" refers to the fraction of light transmitted through an electrochromic film. Unless otherwise stated, the transmissivity of an electrochromic film is represented by the number $T_{vis}$. $T_{vis}$ is calculated/obtained by integrating the transmission spectrum in the wavelength range of 400-730 nm using the spectral photopic efficiency L_p(lambda) (CIE, 1924) as a weighting factor. (Ref: ASTM E1423).

The term "transparent" is used to denote substantial transmission of electromagnetic radiation through a material such that, for example, bodies situated beyond or behind the material can be distinctly seen or imaged using appropriate image sensing technology.

The term "nanostructure" or "nanostructures" as used herein refers to nanowires, nanoparticles, nanofoams, nanoporous films, or any structure with dimensions between microscopic and molecular scale structures.

The term "grinding" as used herein refers to size-reduction of particles by mechanical means. Some examples of grinding apparatuses are a mortar and pestle, various types of ball mills (e.g., planetary ball mill, agitator ball mill, etc.), various types of mills not using balls as the milling media (e.g., rod mill, vibrating mill, etc.), machines using an abrasive wheel as the cutting tool (e.g., a belt grinder or a bench grinder), or other methods using mechanical force to size-reduce particles. Additionally, size-reducing particles can refer to reducing the size of the primary particles, or reducing the size of hard or soft agglomerates comprising primary particles.

The term "hexagonal tungsten trioxide" as used herein refers to a material with the formula $A_yW_{1-x}M_xO_{3\pm z}\cdot kH_2O$), where A is situated within the hexagonal or hexagonal-like channels depicted in FIG. 1 and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. As such, x is from about 0 to about 1, y is from about 0 to about 0.5, and where z can be from about −0.5 to about 0.5. The crystal structure may be hexagonal or have hexagonal-like channels (for example, as depicted in the hexagonal $WO_3$ structure in FIG. 1). The W(M)-O layers are stacked in the [001] direction resulting in 1-dimensional channels. A and/or M also comprise more than one element and be expressed as $A'_a+A''_b+A'''_c$ and/or $M'_d+M''_e+M'''_f$ where A', A" and A'" and/or M', M" and M'" are different elements, where a+b+c=y and d+e+f=x. "Hexagonal tungsten trioxide" can refer to materials including atoms other than tungsten and oxygen, including but not limited to, substituted hexagonal tungsten oxide, hexagonal tungsten bronze and hexagonal tungsten bronze-like materials. The term "hexagonal tungsten oxide" as used herein refers to "hexagonal tungsten trioxide" as defined above.

The term "pyrochlore" as used herein refers to a material with the formula $A_yW_{1-x}M_xO_{3\pm z}\cdot kH_2O$), where A is situated within the hexagonal or hexagonal-like channels depicted in FIG. 1 and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. Under these conditions, x is from about 0 to about 1, y is from above 0 to about 0.5, and where z can be from about −0.5 to about 0.5. The crystal structure may be hexagonal or have hexagonal-like channels (for example, as depicted in the pyrochlore $WO_3$ structure in FIG. 1). Unlike in the hexagonal $WO_3$ structure, the W—O layers are stacked in the [111] direction forming an interconnected network of 3-dimensional channels. A and/or M also comprise more than one element and be expressed as $A'_a+A''_b+A'''_c$ and/or $M'_d+M''_e+M'''_f$ where A', A" and A'" and/or M', M" and M'" are different elements, where $a+b+c=y$ and $d+e+f=x$ "Pyrochlore" can refer to materials comprising atoms other than tungsten and oxygen, including but not limited to, pyrochlore-like, defected pyrochlore, defected pyrochlore-like, substituted pyrochlore, substituted pyrochlore-like, and substituted, defected pyrochlore-like materials.

The term "tungsten trioxide" as used herein refers to a material with the formula $A_yW_{1-x}M_xO_{3\pm z}\cdot kH_2O$ and has any crystal structure where A is situated within interstitial spaces and where M is substituted within the W—O lattice. As such, A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. Under these conditions, x is from about 0 to about 1, y is from above 0 to about 0.5, and where z can be from about −0.5 to about 0.5. A and/or M also comprise more than one element and be expressed as $A'_a+A''_b+A'''_c$ and/or $M'_d+M''_e+M'''_f$ where A', A" and A'" and/or M', M" and M'" are different elements, where $a+b+c=y$ and $d+e+f=x$. "Tungsten trioxide" can refer to materials comprising atoms other than tungsten and oxygen, including but not limited to, substituted tungsten oxide, substituted triclinic tungsten oxide, substituted monoclinic tungsten oxide, substituted orthorhombic tungsten oxide, substituted tetragonal tungsten oxide, substituted hexagonal tungsten oxide, or substituted cubic tungsten oxide. Furthermore, "tungsten trioxide" can refer to structures comprising hexagonal tungsten bronze, hexagonal tungsten bronze-like materials, tetragonal tungsten bronze, tetragonal tungsten bronze-like materials, pyrochlore materials, pyrochlore-like materials, defected pyrochlore materials, defected pyrochlore-like materials, substituted pyrochlore materials or substituted pyrochlore-like materials.

DETAILED DESCRIPTION

Embodiments of the current invention describe methods of producing durable tungsten trioxide, hexagonal tungsten trioxide, or pyrochlore electrochromic films using methods that are amenable to high volume, low cost manufacturing. Additionally, embodiments of the current invention also describe films having robust mechanical properties and deposition methods that are compatible with substrates requiring low maximum processing temperatures.

In particular, this disclosure describes a method to produce metal oxide particles which are deposited as thin films with electrochromic properties. In some embodiments, these particles are prepared using hydrothermal synthesis. In some embodiments, these films are also incorporated into multi-layer stacks, and electrochromic devices. In some cases these particles are tungsten trioxide, hexagonal tungsten trioxide, or pyrochlore particles.

Although there are particular embodiments describes of the tungsten trioxide, hexagonal tungsten trioxide, and pyrochlore variations of the invention, these are not meant to be limiting. The term "polymorph" is here intended to comprise symmetry changes that largely maintain some or all of the same atomic connectivity and unique relationships of atoms that produce unique structural features. Sometimes, however, polymorph may describe an entirely different structure and atomic arrangement but with the same composition. The synthesis and/or thin film deposition method can impact the resulting polymorph. Additional polymorphs of the materials include: triclinic tungsten oxide nanostructures, monoclinic tungsten oxide nanostructures, orthorhombic tungsten oxide nanostructures, tetragonal tungsten oxide nanostructures, hexagonal tungsten oxide nanostructures, cubic tungsten oxide nanostructures, triclinic tungsten trioxide nanostructures, monoclinic tungsten trioxide nanostructures, orthorhombic tungsten trioxide nanostructures, hexagonal tungsten trioxide nanostructures, cubic tungsten oxide nanostructures, substituted triclinic tungsten trioxide nanostructures, substituted monoclinic tungsten trioxide nanostructures, substituted orthorhombic tungsten trioxide nanostructures, substituted tetragonal tungsten trioxide nanostructures, substituted hexagonal tungsten trioxide nanostructures, substituted cubic tungsten oxide nanostructures.

This disclosure describes a method to produce a crystalline thin film, wherein crystalline particles are synthesized, size-reduced by grinding, formulated into an ink, and coated on a substrate to produce a crystalline thin film. The crystalline thin film may be an electrochromic thin film where formed of an electrochromically active metal oxide. This disclosure also describes an electrochromic multi-layer stack comprising a thin film comprising crystalline nanostructures or crystalline metal oxide nanostructures, an electrically conductive layer, and an outer substrate. These multi-layer stacks can also be incorporated into electrochromic devices, such as automobile mirrors and architectural windows. In another embodiment the crystalline thin film has no extra material added such as a binder to enhance physical film characteristics. In some cases, these nanostructures are tungsten trioxide, hexagonal tungsten trioxide, or pyrochlore nanostructures.

This disclosure also describes a method to produce a crystalline thin film, where the substrate may be stable under high temperature conditions, for example glass or quartz or where the substrate may be unstable under high temperature conditions, for example plastics (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers). In an embodiment, the crystalline particles used in the crystalline thin film may comprise a transition metal oxide or a main group metal oxide The crystalline thin film may also be formed of a mixed metal oxide comprising alkali metals, alkaline earth metals, transition metals, main group metals and lanthanide metals or a mixed metal oxide comprising metals and non-metals where the non-metals are may be part of a complex anion such as phosphate, sulfate, selenate, tellurate, silicate, germanate or carbonate. The method to produce the crystalline electrochromic metal oxide thin film may include the synthesizing of the crystalline electrochromic metal oxide particles, the size-reducing of those particles by grinding, the formulating of the size-reduced particles into an ink, and coating the ink on a substrate to produce a crystalline electrochromic metal oxide thin film. In some cases these particles are tungsten trioxide, hexagonal tungsten trioxide, or pyrochlore particles.

In a more particular embodiment, this disclosure describes methods to produce a thin film of crystalline tungsten oxide, crystalline tungsten trioxide with hexagonal channels, or a crystalline pyrochlore. The crystalline tungsten oxide, hexagonal tungsten trioxide, or pyrochlore thin film may be a nanostructure. The crystalline tungsten trioxide or hexagonal tungsten trioxide or pyrochlore may be part of an electrochromic multi-layer stack which also includes an electrically conductive layer and an outer substrate. These multi-layer stacks can also be incorporated into electrochromic devices, such as automobile mirrors and architectural windows.

In some embodiments, the crystalline tungsten oxide particles or crystalline tungsten trioxide particles, or crystalline hexagonal tungsten trioxide particles or crystalline pyrochlore particles are produced using hydrothermal synthesis. The hydrothermal synthesis process provides crystalline material in a mixture with a liquid, which, after further size reduction, can be coated on a substrate. In some embodiments, the crystalline tungsten oxide particles or crystalline tungsten trioxide particles, or crystalline hexagonal tungsten trioxide particles, or crystalline pyrochlore particles are produced using sealed tube synthesis, solid state synthesis, or any synthetic method that can be demonstrated by XRD to prepare crystalline tungsten oxide, crystalline tungsten trioxide, crystalline hexagonal tungsten trioxide or crystalline pyrochlore.

There are a number of advantages of this approach to create a crystalline tungsten oxide, or tungsten trioxide, or pyrochlore thin film on a substrate, such as eliminating the exposure of the substrate to high temperatures, and reducing the equipment and materials costs compared to other state of the art methods such as hydrothermal synthesis directly on a substrate, sol-gel followed by annealing, and physical vapor deposition followed by annealing.

Certain literature teaches away from the use of crystalline materials for electrochromic applications sometimes for synthetic considerations, sometimes for durability considerations, sometimes for rate considerations and sometimes for coloration efficiency considerations. Regarding synthetic considerations, often solid state transition metal oxides require fairly high temperatures for crystallization. The need for high temperatures has implicitly taught away from crystallinity because of the inability of even glass substrates to tolerate the temperatures commonly required. The methodology described here enables the use of any synthetic method and any temperature that may be necessary because synthesis is removed entirely from the substrate by being performed in advance of the deposition of the material on the substrate. Furthermore, the method also allows for a significantly larger opportunity for purification and characterization of the active species since the material is prepared entirely before deposition to the substrate. Regarding the durability, rate and coloration efficiency considerations, crystalline tungsten trioxide electrochromic behavior can vary widely depending on the polymorph of tungsten trioxide in the device. There are some polymorphs of tungsten trioxide, namely hexagonal tungsten trioxide and pyrochlore, which exhibit durability, rates and coloration efficiency in electrochromic devices that is much improved over the typical crystalline tungsten trioxide phases in the literature (e.g., perovskite tungsten trioxide). Not being held to any particular theory, the fact that hexagonal tungsten trioxide and pyrochlore are structurally stable upon insertion and de-insertion of lithium, sodium and other ions is believed to be beneficial.

Tungsten Oxide Nanostructure Thin Films with Large Channels

This disclosure describes a method of producing or manufacturing a thin film including: providing a plurality of crystalline tungsten oxide particles, size-reducing the crystalline tungsten oxide particles by grinding to produce crystalline tungsten oxide nanostructures, formulating an ink of the size-reduced crystalline tungsten oxide nanostructures, and coating the ink onto a substrate to produce a thin film. This disclosure also describes an electrochromic multi-layer stack comprising a thin film comprising crystalline tungsten oxide nanostructures, an electrically conductive layer, and an outer substrate. This disclosure also describes the multi-layer stack incorporated into an electrochromic device. The tungsten oxide particles may be tungsten trioxide, or hexagonal tungsten trioxide, or pyrochlore.

In some embodiments, the tungsten oxide nanostructures comprise crystalline hexagonal tungsten trioxide, or crystalline pyrochlore. One advantage identified by the preparation of films using embodiments of the methodologies disclosed herein is that hexagonal tungsten trioxide and pyrochlore do not experience a phase change upon intercalation with Li. Not to be limited by theory, the hexagonal tungsten trioxide and pyrochlore crystal structures have large open channels throughout, (FIG. 1) that are hypothesized to aid in the diffusion of Li and can accommodate the Li ions without detrimental lattice strain and phase changes associated with poor electrochromic durability. It is therefore desirable to produce thin films containing large open channels, such as hexagonal tungsten trioxide or pyrochlore thin films, for use as electrochromic active layers in electrochromic multi-layer stacks and devices.

Hexagonal tungsten trioxide can have a crystal structure of the space group P6/mmm (#191), where the lattice parameters are a=b=approximately 7.3 (Angstroms), and c=approximately 3.9 (Angstroms). The c-axis can also be reported as two times the 3.9 Å c-axis, in other words approximately 7.8 Å. In some instances, small compositional changes may result in a change of crystal symmetry. In such cases, a substituted hexagonal tungsten trioxide may have lower than hexagonal symmetry and may not crystallize in space group P6/mmm. The arrangement of atoms may be largely the same, however, and arranged as described herein and as shown in FIG. 1. In some embodiments, the structure of hexagonal tungsten trioxide can be described as layers of corner sharing $WO_6$ octahedra perpendicular to the c-axis with 3- and 6-sided cavities in the a-b plane. If the space group is in fact P6/mmm, or another hexagonal group, the cavities may have 3- and 6-fold rotational symmetry. If the space group is of lower symmetry, the arrangement of atoms results in cavities that may have the appearance of 3- and 6-fold rotational symmetry without actually possessing this symmetry.

In some embodiments, the structure of pyrochlore tungsten trioxide can be described as tetrahedral clusters of corner sharing $WO_6$ octahedra. These clusters are connected to form a kagome net. From another perspective, the structure can be described as corner sharing $WO_6$ octahedra 6-sided cavities which are not parallel to each other, but instead form larger tetrahedron structures where the 6-sided cavities are centered on the faces of the tetrahedrons. The pyrochlore structure contains structural components which are similar to the hexagonal structure (the 3- and 6-sided cavities), but in the case of the pyrochlore structure these components are arranged in 3-dimensions instead of layers. If the space group is of a cubic symmetry with space group Fd-3 m, then the described elements will also possess rotational symmetry elements. If the structure is distorted to another crystal system, then these symmetry elements may be broken, but the general connectivity of the $WO_6$ octahedra will remain intact.

Hexagonal tungsten trioxide and pyrochlore compounds are distinct from other more common tungsten oxide materials which have different crystal structures and different symmetries. FIG. 1 illustrates four different polymorphs of tungsten trioxide: monoclinic perovskite, tetragonal perovskite, hexagonal and pyrochlore. The dimensions of the largest interstitial sites are also shown. The channels throughout the hexagonal tungsten trioxide and pyrochlore structures are the largest, with characteristic dimensions of 5.36×5.36 Angstroms and 5.34×5.34 Angstroms, respectively. Monoclinic perovskite and tetragonal perovskite tungsten trioxide have interstitial sites that are smaller and in some cases asymmetric, with dimensions from 3.08 to 4.47 Angstroms, as shown in FIG. 1. Not to be limited by theory, in a material in which ions are to be repetitively intercalated and deintercalated, it is desirable to have an interstitial site that is sufficiently large to enable ion mobility. Further, it is desirable to have an interstitial site that is sufficiently large such that repetitive ion removal and insertion does not result in significant lattice strain, furthermore, it is desirable to have a crystal structure that can tolerate repetitive ion removal and insertion without undergoing a structural phase transition.

As defined above, "hexagonal tungsten trioxide" or "pyrochlore," as used herein has the formula $A_yW_{1-x}M_xO_{3\pm z} \cdot kH_2O$), where A is situated within the hexagonal or hexagonal-like channels depicted in FIG. 1 and where M is substituted within the W—O lattice. A is often a monovalent species such as a proton, an ammonium ion, and/or an alkali metal and may sometimes be an alkaline earth metal. M is a transition metal, other metal, lanthanide, actinide, electrochromic metal or non-electrochromic metal in octahedral coordination. As such, x is from about 0 to about 1, y is from about 0 to about 0.5, and where z can be from about −0.5 to about 0.5. The crystal structure may be hexagonal or hexagonal-like channels (for example, as depicted in both the hexagonal $WO_3$ structure and the pyrochlore structure in FIG. 1). A and/or M also comprise more than one element and be expressed as $A'_a + A''_b + A'''_c$ and/or $M'_d + M''_e + M'''_f$ where A', A" and A'" and/or M', M" and M'" are different elements, where a+b+c=y and d+e+f=x. It follows that "hexagonal tungsten trioxide" or "pyrochlore" can refer to materials including atoms other than tungsten and oxygen, including but not limited to, substituted hexagonal tungsten oxide, hexagonal tungsten bronze and hexagonal tungsten bronze-like materials or pyrochlore-like, defected pyrochlore, defected pyrochlore-like, substituted pyrochlore, substituted pyrochlore-like, and substituted, defected pyrochlore-like materials, respectively. The term "hexagonal tungsten oxide" as used herein refers to "hexagonal tungsten trioxide" as defined above while the term "pyrochlore" as used herein refers to pyrochlore, pyrochlore $WO_3$, p-$WO_3$ or py-$WO_3$ as defined above. In some embodiments, tungsten trioxide or hexagonal tungsten trioxide or pyrochlore has a composition described by the formula $WO_{3-x}$, where x describes a small number of oxygen vacancies. In some embodiments x has a value from 0 to 0.05, or from 0.05 to 0.1, or from 0 to 0.1, or from 0.1 to 0.2. If the tungsten trioxide compound has too little oxygen, often it will have low transmission in the oxidized state. For example, a ratio of tungsten to oxygen that is less than 1:3 implies that the oxidation state of the tungsten is less than 6+. In such a situation, the material could be expected to demonstrate low transmission. Low transmission in the bleached state is undesirable in certain applications, such as for films that are used as cathodes in electrochromic devices. In some embodiments, tungsten can be augmented by the addition of substituted metals that have an oxidation state less than 6+. In certain cases, the material may display a metal (tungsten+substituted metal) to oxygen ratio that is less than 1:3 if all metals are in their highest oxidation state. In these cases, a ratio that is less than 1:3 may not result in low transmission. In some embodiments, tungsten can be replaced by other metals and still maintain the hexagonal tungsten oxide structure or pyrochlore structure shown in FIG. 1. As defined herein, hexagonal tungsten oxide or pyrochlore comprises tungsten, oxygen and other cations or anions such that the hexagonal tungsten oxide or pyrochlore atomic arrangement is maintained, in a general sense, respectively. For example, tungsten may be partially substituted by molybdenum or another metal. If the partial substitution results in crystallographic ordering, the lattice parameters may change and/or the space group, crystal symmetry and atomic positions may change but the general arrangement of atoms in 3 dimensions is maintained. In some embodiments, M can be a mobile cation that can be intercalated/deintercalated. These mobile cations are largely +1 cations but could be +2 cations also (e.g. $Li^+$, $Na^+$, $K^+$, $Rb^+$, $Cs^+$, $NH4^+$, $H^+$, $Mg^{2+}$, $Ca^{2+}$). In some embodiments, M can be EC active metals including early transition metals or main group metals that are octahedrally coordinated, in which the highest oxidation states are clear or lightly colored, and are redox active in the voltage range of interest (e.g. V, Nb, Ta, Cr, Mo, Ti, Sb, Sn). In some embodiments, M can be an EC inactive metal including early transition metals or main group metals that are octahedrally coordinated, in which stable oxidation states are clear or lightly colored, and are not redox active in the voltage range of interest (e.g. Hf, In, Ga, Ge).

In some embodiments, the crystalline hexagonal tungsten trioxide or pyrochlore nanostructures are nano-scale in 3 dimensions (i.e. are nanoparticles, not nanowires).

In some embodiments, the crystalline hexagonal tungsten trioxide or pyrochlore particles are produced via hydrothermal synthesis. In some embodiments, the crystalline hexagonal tungsten trioxide or pyrochlore particles are produced by hydrothermal synthesis, then size-reduced by grinding to produce crystalline hexagonal tungsten trioxide or pyrochlore nanostructures, then the nanostructures are formulated into an ink, then the ink is coated onto a substrate. In an embodiment, the ink is made without the addition of a binder which simplifies the formulation of the material and improves the manufacturability of electrochromic films deposited using methods described herein.

The substrate onto which the above films may be deposited may have a melting point less than 1000° C., or less than 900° C., less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 1200° C. to 1300° C., or from 1300° C. to 1400° C., or from 1400° C. to 1500° C., or from 1500° C. to 1600° C.

In one embodiment of the current invention, the substrate may be thicker than 50 micron. The substrate may also be an electrically conducting layer and an outer substrate, where the material of the outer substrate may be selected from materials such as glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers). The material of the electrically conductive layer may be selected from a group consisting of: transparent conductive oxides, thin metallic coatings, networks of conductive nanoparticles (e.g., rods, tubes, dots), conductive metal nitrides, and composite conductors.

In some embodiments the reagents for the hydrothermal synthesis of the hexagonal tungsten trioxide or pyrochlore are $Na_2WO_4*2H_2O$, NaCl, DI $H_2O$ and HCl. In some embodiments the ratio by mass of $Na_2WO_4*2H_2O$ to NaCl is 4:1, or is 5:1, or is 6:1, or is 7:1, or is 10:1, or is 5:2, or is 5:3, or is 5:4, or is 1:1, or is 5:6, or is 5:7, or is 1:2. In some embodiments the ratio by mass of $Na_2WO_4*2H_2O$ plus NaCl to DI $H_2O$ is 2:45, or is 4:45, or is 6:45, or is 8:45, or is 10:45, or is 15:45, or is 20:45.

In some embodiments, the reagents for the hydrothermal synthesis of the hexagonal tungsten trioxide or pyrochlore could comprise $Li_2WO_4$, $Na_2WO_4$, $K_2WO_4$, $Rb_2WO_4$, $Cs_2WO_4$ or $H_2WO_4$, in addition to or instead of $Na_2WO_4*2H_2O$ in the above set of reagents. Additionally, these alkali reagents could be produced in situ during the reaction to form hexagonal tungsten trioxide or pyrochlore, for instance by adding $H_2O_2$ to tungsten metal.

In some embodiments, the reagents for the hydrothermal synthesis of the hexagonal tungsten trioxide or pyrochlore could comprise $Na_2SO_4$, citric acid, aniline, ammonium tartrate, tartartic acid, other alkali sulfates (e.g., $Li_2SO_4$), or other alkali chlorides (e.g., LiCl), in addition to or instead of NaCl in the above set of reagents. The preceding list is not limiting and other reagents and/or combinations of reagents will be obvious to those skilled in the art.

In some embodiments the pH of the hydrothermal synthesis of the hexagonal tungsten trioxide or pyrochlore reaction at the onset is 1.0, or is 1.5, or is 2, or is 2.5, or is 3, or is 3.5 or is 4.0, or is from 1.0 to 2.5, or is from 1.9 to 2.1, or is from 1.5 to 2, or is from 2 to 2.5 or is from 3.5 to 4.0. The pH has a large effect on the resulting phase of tungsten oxide created. For example, if the pH of the hydrothermal synthesis of the tungsten oxide reaction at the onset is less than 1.0, then a mixed phase tungsten oxide can be produced. For example, if the pH of the hydrothermal synthesis of the tungsten oxide reaction at the onset is 1.5, then hexagonal tungsten trioxide will be produced. For example, if the pH of the hydrothermal synthesis of the tungsten oxide reaction at the onset is 3.5, then a hydrate pyrochlore structure is produced.

In some embodiments, the hydrothermal synthesis of the hexagonal tungsten trioxide or pyrochlore reaction is held at 160° C. for 1 hour, or at 180° C. for 1 hour, or at 200° C. for 1 hour, or at 160° C. for 3 hours, or at 180° C. for 3 hours, or at 200° C. for 3 hours, or at 160° C. for 4 hours, or at 180° C. for 4 hours, or at 200° C. for 4 hours, or at 160° C. for 5 hours, or at 180° C. for 5 hours, or at 200° C. for 5 hours, or at 160° C. for 10 hours, or at 180° C. for 10 hours, or at 200° C. for 10 hours, or at 160° C. for 12 hours, or at 180° C. for 12 hours, or at 200° C. for 12 hours, or at 160° C. for 24 hours, or at 180° C. for 24 hours, or at 200° C. for 24 hours, or at 160° C. for 48 hours, or at 180° C. for 48 hours, or at 200° C. for 48 hours, or at 160° C. for longer than 48 hours, or at 180° C. for longer than 48 hours, or at 200° C. for longer than 48 hours.

In some embodiments the hydrothermally synthesized hexagonal tungsten trioxide or pyrochlore is washed on a filter. In some embodiments the hydrothermally synthesized hexagonal tungsten trioxide or pyrochlore is washed using a centrifuge washing method. In some embodiments, DI water is used to wash the hydrothermally synthesized tungsten trioxide. In some embodiments, DI water followed by isopropyl alcohol is used to wash the hydrothermally synthesized tungsten trioxide. In other embodiments, any solvent in which the additive reagents are soluble followed by water can be used in the washing process, such as 1 M LiOH followed by DI water.

In some embodiments, the hydrothermally synthesized hexagonal tungsten trioxide or pyrochlore is washed, and separated from the washed contaminants by centrifuging at 3000 rpm, or at 3500 rpm, or at 4000 rpm, or at 4500 rpm, or at 5000 rpm, or at 5500 rpm, or at 6000 rpm. In some embodiments, the hydrothermally synthesized tungsten oxide is washed, and separated from the washed contaminants by washing and centrifuging once, or by washing and centrifuging twice, by washing and centrifuging three times, by washing and centrifuging four times, by washing and centrifuging five times, by washing and centrifuging six times, by washing and centrifuging using a continuous flow centrifuge process. In some embodiments, the washed contaminants could be removed from the hydrothermally synthesized tungsten oxide using a membrane filtering method.

In some embodiments, the hydrothermally synthesized hexagonal tungsten trioxide or pyrochlore could be further size-reduced by grinding. In some embodiments the hydrothermally synthesized hexagonal tungsten trioxide or pyrochlore could be size-reduced using a mortar and pestle, or using an agitator bead mill, or using a planetary mill, or using a linear impact mill, or any method which reduces particle size through mechanical means.

In some embodiments an agitator bead mill, or a planetary mill is used to reduce the size of the hydrothermally synthesized hexagonal tungsten trioxide or pyrochlore, using milling media that is 0.03 mm in diameter, or 0.05 mm in diameter, or 0.1 mm in diameter, or 0.2 mm in diameter, or 0.3 mm in diameter, or 0.4 mm in diameter, or 0.5 mm in diameter. In some embodiments an agitator bead mill, or a planetary mill is used to reduce the size of the hydrothermally synthesized hexagonal tungsten trioxide or pyrochlore, using milling media that comprises a hard ceramic material, or $ZrO_2$, or $HfO_2$, or $Y_2O_3$, or an alloy of $ZrO_2$ and $HfO_2$, or an alloy of $ZrO_2$ and $Y_2O_3$, or an alloy of $ZrO_2$ and $HfO_2$ and $Y_2O_3$, or $CeO_2$, or an alloy of $ZrO_2$ and $CeO_2$, or $SiO_2$, or an alloy of $ZrO_2$ and $SiO_2$, or steel.

In some embodiments an agitator bead mill, or a planetary mill is used to reduce the size of the hydrothermally synthesized hexagonal tungsten trioxide or pyrochlore, using water, isopropyl alcohol (IPA), propylene glycol propyl ether (PGPE), or heptanol as the solvent. In some embodiments, low molecular weight alcohols (e.g., propanol or butanol), or organic solvents with viscosity less than 5 cP are used as a solvent. In some embodiments an agitator bead mill, or a planetary mill is used to reduce the size of the hydrothermally synthesized hexagonal tungsten trioxide or pyrochlore, using multiple milling cycles, wherein each cycle has an active milling period and an inactive period wherein the mill is allowed to cool. In some embodiments an agitator bead mill, or a planetary mill is used to reduce the size of the hydrothermally synthesized tungsten oxide, using a milling speed of 500 rpm. In some embodiments an agitator bead mill, or a planetary mill is used to reduce the size of the hydrothermally synthesized tungsten oxide, wherein the active milling period has a duration of from 1 to 10 min, and an inactive duration of from 1 to 10 min, and a total of from 5 to 50 cycles. In some embodiments an agitator bead mill, or a planetary mill is used to reduce the size of the hydrothermally synthesized tungsten oxide, wherein the mill is cooled and milling is performed for a duration of 10 min to 10 hours. In some embodiments an agitator bead mill, or a planetary mill is used to reduce the size of the hydrothermally synthesized tungsten oxide, wherein the milling is performed until the particle size is less than 250 nm diameter, or less than 200 nm diameter, or less than 150 nm diameter, or less than 100 nm diameter.

In some embodiments, milling is performed in a continuous manner. In some embodiments, milling is performed in a continuous manner with fractions of the total milling volume. In some embodiments, milling is performed in a continuous manner with fractions of the total milling volume where the remainder of the total milling volume is stored in a storage vessel allowing cooling. In some embodiments, milling is performed in a continuous manner such that the active milling period and the inactive milling period are the same as milling performed in a batch manner. In some embodiments, milling is performed using a mill with continuous circulation of the slurry from a holding tank to the milling chamber and/or a cooled milling chamber, which optionally enables milling processes without cooling periods.

In some embodiments, there is a first grinding step and a second grinding step using different methods to reduce the size of the hydrothermally synthesized hexagonal tungsten trioxide or pyrochlore. In some embodiments, the first grinding step to reduce the size of the hydrothermally synthesized tungsten oxide comprises a mortar and pestle, and the second grinding step to reduce the size of the hydrothermally synthesized tungsten oxide comprises an agitator bead mill, or a planetary mill. In some embodiments the first grinding step comprises an agitator bead mill, or a planetary mill with a larger media size and the second grinding step comprises an agitator bead mill, or a planetary mill with a smaller media size.

In some embodiments the mean particle size of the size-reduced hexagonal tungsten trioxide or pyrochlore nanostructures after grinding is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the median particle size of the size-reduced hexagonal tungsten trioxide or pyrochlore nanostructures after grinding is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm.

In some embodiments the polydispersity index (as defined in the ISO standard document 13321:1996 E and ISO 22412:2008) of the particle size distribution of the hexagonal tungsten trioxide or pyrochlore nanostructures after grinding is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution hexagonal tungsten trioxide or pyrochlore nanostructures after grinding is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the size-reduced hexagonal tungsten trioxide or pyrochlore nanostructures after grinding, washing, and separating from the washed contaminants, is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the median particle size of the size-reduced hexagonal tungsten trioxide or pyrochlore nanostructures after grinding, washing, and separating from the washed contaminants, is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm.

In some embodiments the polydispersity index (as defined in the ISO standard document 13321:1996 E and ISO 22412:2008) of the particle size distribution of the size-reduced hexagonal tungsten trioxide or pyrochlore nanostructures after grinding, washing, and separating from the washed contaminants, is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the size-reduced hexagonal tungsten trioxide or pyrochlore nanostructures after grinding, washing, and separating from the washed contaminants, is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the hexagonal tungsten trioxide or pyrochlore nanostructures after grinding, washing, and a first grinding step is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the polydispersity index (as defined in the ISO standard document 13321:1996 E and ISO 22412:2008) of the particle size distribution of the size-reduced hexagonal tungsten trioxide or pyrochlore nanostructures after grinding, washing, and a first grinding step, is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution of the size-reduced hexagonal tungsten trioxide or pyrochlore nanostructures after grinding, washing, and a first grinding step, is less than 0.6, or less than 0.55 or less than 0.5, or less than 0.45, or less than 0.4, or less than 0.35, or less than 0.3, or from 0.3 to 0.45, or from 0.3 to 0.55.

In some embodiments the mean particle size of the hexagonal tungsten trioxide or pyrochlore nanostructures after grinding, washing, a first grinding step, and a second grinding step is from 50 to 300 nm, or from 100 to 300 nm, or from 150 to 300 nm, or from 200 to 300 nm, or from 250 to 300 nm, or from 100 to 250 nm, or from 50 to 250 nm, or from 50 to 200 nm, or from 50 to 150 nm, or from 50 to 100, or less than 300 nm, or less than 250 nm, or less than 200 nm, or less than 150 nm, or less than 100 nm. In some embodiments the polydispersity index (as defined in the ISO standard document 13321:1996 E and ISO 22412:2008) of the particle size distribution of the hexagonal tungsten trioxide or pyrochlore nanostructures after grinding, washing, a first grinding step, and a second grinding step is less than 0.4, or less than 0.35 or less than 0.3, or less than 0.25, or less than 0.2, or less than 0.15, or less than 0.1, or from 0.1 to 0.2, or from 0.1 to 0.3. In some embodiments the coefficient of variation of the particle size distribution hexagonal tungsten trioxide or pyrochlore nanostructures after grinding, washing, a first grinding step, and a second grinding step is less than 0.6, or less than 0.55 or less than 0.5, or less than 0.45, or less than 0.4, or less than 0.35, or less than 0.3, or from 0.3 to 0.45, or from 0.3 to 0.55.

In some embodiments, after the tungsten oxide, or tungsten trioxide, or hexagonal tungsten trioxide, or pyrochlore particles are size-reduced by grinding, the resulting nanostructures are filtered to remove the grinding media and any other large diameter solids. In some embodiments the filter pore diameter is 0.7 micron or less. In some embodiments the filter pore diameter is 0.45 micron or less. In some embodiments the filter pore diameter is 0.18 micron or less.

In some embodiments the tungsten oxide, or tungsten trioxide, or hexagonal tungsten trioxide, or pyrochlore nanostructures are coated onto a substrate using slot die coating, and the wet coating thickness is from 25 to 40 microns, or from 30 to 50 microns, or from 50 to 80 microns. The concentration by mass of the solid nanostructures determines what wet coating thickness is required to achieve a target dry film thickness. In some embodiments, the dry film thickness is approximately 1 micron, or from 0.1 to 10 microns, or from 0.5 to 1.5 microns, or from 0.2 to 2 microns.

In one example, a dry film of hexagonal tungsten trioxide or pyrochlore nanostructures is targeted, which has an approximate thickness of 1 micron, and an approximate capacity of 30 mC/cm$^2$. In this example, the formula used to relate the solids loading in wt % (i.e. concentration by mass) of the tungsten trioxide nanostructures ink to the target wet coating thickness in microns to is:

Wet Thickness=[0.10/(weight % solids loading)]*37.5

Therefore, an 8 wt % solids loading ink would be coated at a wet thickness of 46.9 microns, a 10 wt % solids loading ink would be coated at a wet thickness of 37.5 microns, and a 12 wt % solids loading ink would be coated at a wet thickness of 31.25 microns.

In some embodiments the tungsten oxide, or tungsten trioxide, or hexagonal tungsten trioxide, or pyrochlore nanostructures are coated onto a substrate using slot die coating, and the coating speed is from 400 to 600 cm/min, or from 200 to 500 cm/min. Different solvents can be used for coating, such as water, IPA, or propylene glycol propyl ether (PGPE), and the optimal coating speed will be different for different types of solvents. For example, tungsten oxide nanostructures dispersed in isopropyl alcohol (IPA) has an optimal coating speed of approximately 400 cm/min, and a process window of approximately 200 to 500 cm/min. In another example, tungsten oxide nanostructures dispersed in PGPE has an optimal coating speed of approximately 500 cm/min.

In some embodiments the tungsten oxide, or tungsten trioxide, or hexagonal tungsten trioxide, or pyrochlore nanostructures are coated onto a substrate using slot die coating, and the die lip to substrate gap is from 60 to 160 microns. The die lip to substrate gap is larger for thicker desired wet coating thicknesses. In some embodiments, the die lip to substrate gap is twice as large as the desired wet coating thickness.

In some embodiments the tungsten oxide, or tungsten trioxide, or hexagonal tungsten trioxide, or pyrochlore nanostructures are coated onto a substrate using slot die coating, and the gap between the die halves is approximately 100 microns.

In some embodiments the tungsten oxide, or tungsten trioxide, or hexagonal tungsten trioxide, or pyrochlore nanostructures are coated onto a substrate using wet coating techniques, and subsequently dried in a vacuum. If a low vapor pressure solvent is used to coat the nanostructures, then a vacuum dry can improve the uniformity and process time required to remove the solvent. In some embodiments, propylene glycol propyl ether (PGPE) is used as the coating solvent and vacuum dried at from approximately 150 to 200 mTorr for from approximately 1 to 2 min per approximately 235 cm$^2$ area of wet coated substrate.

In some embodiments the tungsten oxide, or tungsten trioxide, or hexagonal tungsten trioxide, or pyrochlore nanostructures are coated onto a substrate using wet coating techniques, and leveling agents are used to improve the coated film uniformity. In some embodiments, a low vapor pressure solvent (e.g., PGPE) is used with a leveling agent with a low surface tension leveling agent (e.g., 2,3-butane diol).

In some embodiments, the thin film of hexagonal tungsten trioxide or pyrochlore nanostructures does not comprise a binder material. In some embodiments, the thin film of hexagonal tungsten trioxide or pyrochlore nanoparticles does not comprise a binder material. In some embodiments, the thin film of hexagonal tungsten trioxide or pyrochlore nanostructures size-reduced by grinding does not comprise a binder material. In some embodiments, hexagonal tungsten trioxide or pyrochlore is produced via hydrothermal synthesis, a colloidal dispersion of hexagonal tungsten trioxide or pyrochlore is produced, and then the ink is coated on a substrate to produce a thin film of tungsten trioxide nanostructures, wherein the thin film of hexagonal tungsten trioxide or pyrochlore nanostructures does not comprise a binder material. Many thin films formed from pluralities of nanostructures utilize a binder material to improve the mechanical properties of the resulting films. Silver nanoparticles or nanowires, used for conducting lines on electronic devices use binder materials (such as urethane acrylate, polyvinyl alcohol, gelatin, polypyrrolidone, epoxies, phenolic resins, acrylics, urethanes, silicones, styrene allyl alcohols, polyalkylene carbonates, and/or polyvinyl acetals) to improve the electrical and/or mechanical properties of the films. [U.S. Patent Application Publication 2009/0130433 A1] [WO 2013036519 A1] In some embodiments, the nanostructures described in this disclosure do not require binder materials to achieve good adhesion to the substrates.

In some embodiments, the substrate comprises a material with a low melting point, and/or a low glass transition temperature, and/or a low softening point. One advantage of the methods described in some embodiments in this disclosure is that crystalline hexagonal tungsten trioxide or pyrochlore can be synthesized, and subsequently coated on a substrate. This enables high temperature materials synthesis to impart certain properties to the produced materials, without the need to expose the substrate to high temperatures. In some embodiments, the substrate is exposed to a maximum temperature of 50° C., or a maximum temperature of 100° C., or a maximum temperature of 150° C., or a maximum temperature of 200° C., or a maximum temperature of 250° C., or a maximum temperature of 300° C., or a maximum temperature of 350° C., or a maximum temperature of 400° C., or a maximum temperature of 450° C., or a maximum temperature of 500° C. In some embodiments, the substrate comprises a material with a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 1200° C. to 1300° C., or from 1300° C. to 1400° C., or from 1400° C. to 1500° C., or from 1500° C. to 1600° C., or a glass transition temperature less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C., or a softening point less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C.

The tungsten oxide, or tungsten trioxide, or hexagonal tungsten trioxide, or pyrochlore nanoparticles described in this disclosure can be deposited onto substrates using many different methods. For example, tungsten oxide nanoparticles can be deposited by wet coating techniques, such as spin, dip, spray, gravure, slot, roll, and ink-jet coating. In some embodiments, these methods can be used to deposit tungsten oxide nanoparticle films onto individual substrates. In some embodiments, these methods can be used to deposit tungsten oxide nanoparticle films in a continuous roll-to-roll process. In some embodiments, the films are deposited in a low-particle clean room environment. In some embodiments, the solvent for the tungsten oxide nanoparticles can be evaporated in air at room temperature, or the coating solvent can be removed using applied heat, or vacuum, or both applied heat and vacuum. In some embodiments, a post deposition heat treatment can be used, in an air, or inert, or reactive environment. In some embodiments, the deposited tungsten oxide nanoparticle film is unreactive with oxygen and/or moisture. In some embodiments, the deposited tungsten oxide nanoparticle film is maintained in an inert environment (e.g., humidity controlled air or nitrogen) to avoid undesirable reactions with oxygen and/or moisture.

Figure 2:
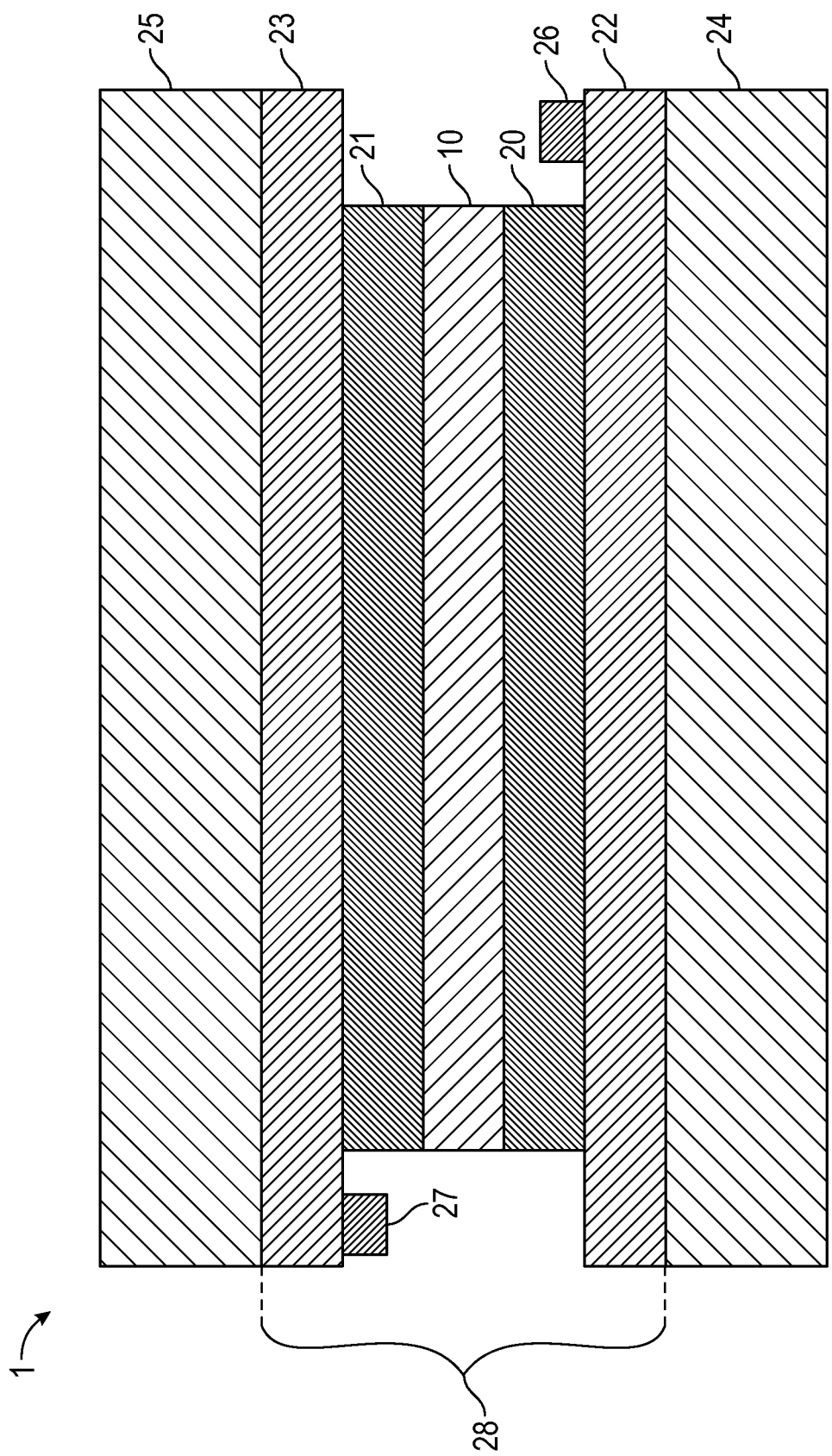
FIG. 2 is a schematic cross-section of a multi-layer electrochromic device of the present disclosure.

Electrochromic Multi-Layer Stacks with Tungsten Oxide Nanostructures with Large Channels FIG. 2 depicts a cross-sectional structural diagram of electrochromic device 1 according to a first embodiment of the present disclosure. Moving outward from the center, electrochromic device 1 comprises an ion conductor layer 10. First electrode layer 20 is on one side of and in contact with a first surface of ion conductor layer 10, and second electrode layer 21 is on the other side of and in contact with a second surface of ion conductor layer 10. In addition, at least one of first and second electrode layers 20, 21 comprises electrochromic material; in one embodiment, first and second electrode layers 20, 21 each comprise electrochromic material. The central structure, that is, layers 20, 10, 21, is positioned between first and second electrically conductive layers 22 and 23 which, in turn, are arranged against "outer substrates" 24, 25. Elements 22, 20, 10, 21, and 23 are collectively referred to as an electrochromic stack 28.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of the electrochromic stack 28 may be changed by applying a voltage pulse to electrically conductive layers 22 and 23. The pulse causes electrons and ions to move between first and second electrode layers 20 and 21 and, as a result, electrochromic material in the first and/or second electrode layer(s) change(s) optical states, thereby switching electrochromic stack 28 from a more transmissive state to a less transmissive state, or from a less transmissive state to a more transmissive state. In one embodiment, electrochromic stack 28 is transparent before the voltage pulse and less transmissive (e.g., more reflective or colored) after the voltage pulse or vice versa.

It should be understood that the reference to a transition between a less transmissive and a more transmissive state is non-limiting and is intended to describe the entire range of transitions attainable by electrochromic materials to the transmissivity of electromagnetic radiation. For example, the change in transmissivity may be a change from a first optical state to a second optical state that is (i) relatively more absorptive (i.e., less transmissive) than the first state, (ii) relatively less absorptive (i.e., more transmissive) than the first state, (iii) relatively more reflective (i.e., less transmissive) than the first state, (iv) relatively less reflective (i.e., more transmissive) than the first state, (v) relatively more reflective and more absorptive (i.e., less transmissive) than the first state or (vi) relatively less reflective and less absorptive (i.e., more transmissive) than the first state. Additionally, the change may be between the two extreme optical states attainable by an electrochromic device, e.g., between a first transparent state and a second state, the second state being opaque or reflective (mirror). Alternatively, the change may be between two optical states, at least one of which is intermediate along the spectrum between the two extreme states (e.g., transparent and opaque or transparent and mirror) attainable for a specific electrochromic device. Unless otherwise specified herein, whenever reference is made to a less transmissive and a more transmissive, or even a bleached-colored transition, the corresponding device or process encompasses other optical state transitions such as non-reflective-reflective, transparent-opaque, etc. Further, the term "bleached" may refer to an optically neutral state, e.g., uncolored, transparent or translucent. Still further, unless specified otherwise herein, the "color" of an electrochromic transition is not limited to any particular wavelength or range of wavelengths. As understood by those of skill in the art, the choice of appropriate electrochromic and counter electrode materials governs the relevant optical transition.

In general, the change in transmissivity preferably comprises a change in transmissivity to electromagnetic radiation having a wavelength in the range of infrared to ultraviolet radiation. For example, in one embodiment the change in transmissivity is predominately a change in transmissivity to electromagnetic radiation in the infrared spectrum. In a second embodiment, the change in transmissivity is to electromagnetic radiation having wavelengths predominately in the visible spectrum. In a third embodiment, the change in transmissivity is to electromagnetic radiation having wavelengths predominately in the ultraviolet spectrum. In a fourth embodiment, the change in transmissivity is to electromagnetic radiation having wavelengths predominately in the ultraviolet and visible spectra. In a fifth embodiment, the change in transmissivity is to electromagnetic radiation having wavelengths predominately in the infrared and visible spectra. In a sixth embodiment, the change in transmissivity is to electromagnetic radiation having wavelengths predominately in the ultraviolet, visible and infrared spectra.

Electrochromic Multi-Layer Stacks with Tungsten Oxide Cathodes

This disclosure describes an electrochromic multi-layer stack comprising a thin film comprising hexagonal tungsten trioxide or pyrochlore nanostructures, an electrically conductive layer, and an outer substrate. This disclosure also describes a method to produce a thin film of hexagonal tungsten trioxide or pyrochlore, wherein hexagonal tungsten trioxide or pyrochlore particles are synthesized, size-reduced by grinding to produce hexagonal tungsten trioxide or pyrochlore nanostructures, formulated into an ink, and coated on a substrate to produce a thin film of hexagonal tungsten trioxide or pyrochlore.

In some embodiments (FIG. 2), the electrochromic multi-layer stack comprises outer substrates 24, 25; electrically conductive layers 22, 23; electrodes 20, 21 comprising an electrochromic cathode comprising a thin film comprising hexagonal tungsten trioxide nanostructures, and a matched electrochromic anode; and an ion conductor layer 10. In some embodiments, an electrochromic device comprises the electrochromic multi-layer stack comprising hexagonal tungsten trioxide or pyrochlore nanostructures described above.

Oxides of W, Nb, Ta, Ti, V, and Mo color under charge insertion (reduction) and are referred to as cathodic electrochromic materials. Oxides of Ni, Cr, Mn and Ir color upon charge extraction (oxidation) and are anodic electrochromic materials. In one embodiment, cathodically coloring films include oxides based on tungsten, molybdenum, niobium, and titanium.

In some embodiments, the cathode of an electrochromic multi-layer stack comprises hexagonal tungsten trioxide or pyrochlore. In some embodiments, the cathode of an electrochromic multi-layer stack comprises hexagonal tungsten trioxide or pyrochlore synthesized by hydrothermal synthesis.

In some embodiments, a method of producing the cathode of an electrochromic multi-layer stack comprises synthesizing hexagonal tungsten trioxide particles by hydrothermal synthesis; size-reducing the hexagonal tungsten trioxide particles by grinding to produce crystalline hexagonal tungsten trioxide nanostructures; and coating the hexagonal tungsten trioxide nanostructures on a substrate. In some embodiments, a method of producing the cathode of an electrochromic multi-layer stack comprises synthesizing pyrochlore particles by hydrothermal synthesis; size-reducing the pyrochlore particles by grinding to produce crystalline pyrochlore nanostructures; and coating the pyrochlore nanostructures on a substrate. In some embodiments, a method of producing the cathode of an electrochromic multi-layer stack comprises synthesizing hexagonal tungsten trioxide particles by hydrothermal synthesis; size-reducing the hexagonal tungsten trioxide particles by grinding to produce crystalline hexagonal tungsten trioxide nanostructures; and coating the hexagonal tungsten trioxide nanostructures on a substrate, without the addition of a binder. In some embodiments, a method of producing the cathode of an electrochromic multi-layer stack comprises synthesizing pyrochlore particles by hydrothermal synthesis; size-reducing the pyrochlore particles by grinding to produce crystalline pyrochlore nanostructures; and coating the pyrochlore nanostructures on a substrate, without the addition of a binder.

In some embodiments, a method of producing the cathode of an electrochromic multi-layer stack comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate has a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 1200° C. to 1300° C., or from 1300° C. to 1400° C., or from 1400° C. to 1500° C., or from 1500° C. to 1600° C. In some embodiments, a method of producing the cathode of an electrochromic multi-layer stack comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate has a glass transition temperature less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C. In some embodiments, a method of producing the cathode of an electrochromic multi-layer stack comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate has a softening point less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C.

In some embodiments, a method of producing the cathode of an electrochromic multi-layer stack comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate is thicker than 50 microns.

In some embodiments, a method of producing the cathode of an electrochromic multi-layer stack comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate comprises an electrically conducting layer and outer substrate, and the material of the outer substrate is selected from the group consisting of: glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

In some embodiments, a method of producing the cathode of an electrochromic multi-layer stack comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate comprises an electrically conducting layer and outer substrate, and the material of the electrically conductive layer is selected from a group consisting of: transparent conductive oxides, thin metallic coatings, networks of conductive nanoparticles (e.g., rods, tubes, dots), conductive metal nitrides, and composite conductors.

A tungsten trioxide, or hexagonal tungsten trioxide, or pyrochlore cathode in an EC multi-layer stack is intercalated and deintercalated with a cation (e.g. $H^+$, $Li^+$ or $Na^+$) during switching. In some embodiments, the formula of tungsten oxide, or hexagonal tungsten trioxide, or pyrochlore upon intercalation is $A_yW_{1-x}M_xO_{3\pm z}$, where A is a Group IA element, M is an octahedrally coordinated metal, x has a value from 0.0 to 1.0, y has a value of 0 to 1 and z has a value from 0.0 to 0.3.

Intercalation of cations (e.g. $H^+$ or $Li^+$) causes the reduction of tungsten (e.g., $W^{6+}$ converting to $W^{5+}$ and/or $W^{4+}$), which in turn reduces the transmission of the material. This is what occurs, for instance, to the cathode during the switching of an electrochromic device from a bleached state to a darkened state. Therefore certain cation impurities in the as-deposited film will degrade the transmission of the film, which is undesirable in certain applications (e.g., in cathodes of electrochromic devices). In some embodiments, the value of z in the as-deposited film is from about 0.0 to about 0.05, or from about 0.05 to about 0.1, or from about 0.0 to about 0.2 depending on the exact value of y. For example, if a material such as $Na_{0.25}WO_{3\pm z}$ is prepared, then z may be understood to be 0.125. In some embodiments, excess oxygen is incorporated in greater amounts that do not degrade the transmission and z can be greater than 0.2, or greater than 0.3, or greater than 0.4, or greater than 0.5. In some embodiments, k should be 0 or as close to 0 as feasible to avoid photochemical degradation mechanisms. In some embodiments the value of k is less important. It is understood that the band gap of the material prepared will be relevant to whether the presence of water (and whether k does or does not equal zero) is important. In some embodiments, the tungsten oxide film will be incorporated into an electrochromic multi-layer stack, or an electrochromic device, and a mobile cation is added (e.g., $Li^+$). In some embodiments, the mobile cation is introduced in an ion conductor layer. In some embodiments, the tungsten oxide is incorporated into an electrochromic device, and is subsequently reduced (e.g., by switching the electrochromic device to a darkened state), wherein the mobile cation will be intercalated into the tungsten oxide, and y will be increased to a value from about 0.1 to about 0.5, or from about 0.1 to about 0.7, or from about 0.1 to about 1.0, or from about 0.3 to about 0.5, or from about 0.3 to about 0.7, or from about 0.3 to about 1.0. In electrochromic devices, such as architectural windows, this reaction is reversible.

Electrochromic Multi-Layer Stack Ion Conductors

Ion conductor layer 10 serves as a medium through which ions are transported (in the manner of an electrolyte) when the electrochromic device switches between an optically less transmissive ("colored") state and an optically more transmissive ("bleached") state. Stated differently, the ion conducting layer permits sufficient ionic conduction between the first and second electrode layers 20, 21 upon the application of a voltage across electrochromic stack 28. Depending on the choice of materials, such ions include lithium ions (Li+) and hydrogen ions (H+) (i.e., protons). Other ions may also be employed in certain embodiments. These include deuterium ions (D+), sodium ions (Na+), potassium ions (K+), rubidium ions (Rb+), cesium ions (Cs+), ammonium ions ($NH_4$+), calcium ions (Ca++), barium ions (Ba++), strontium ions (Sr++), magnesium ions (Mg++) or others. In one embodiment, ion conductor layer 10 has a lithium ion conductivity of at least about $10^{-5}$ S/cm at room temperature (i.e., 25° C.). For example, in one such embodiment, ion conductor layer 10 has a lithium ion conductivity of at least about $10^{-4}$ S/cm at room temperature. By way of further example, in one such embodiment ion conductor layer 10 has a lithium ion conductivity of at least about $10^{-3}$ S/cm at room temperature. By way of further example, in one such embodiment ion conductor layer 10 has a lithium ion conductivity of at least about $10^{-2}$ S/cm at room temperature. Preferably, ion conductor layer 10 has sufficiently low electron conductivity that negligible electron transfer takes place during normal operation.

Ion conductor layer 10 is also preferably sufficiently durable so as to withstand repeated cycling of the electrochromic device between an optically less transmissive state and an optically more transmissive state. For example, in one such embodiment, lithium ion conductivity of ion conductor layer 10 varies less than about 5% upon cycling of the electrochromic device between a less transmissive state (e.g. about 5% transmissive) and a more transmissive state (e.g. about 70% transmissive) for at least 100 hours at 85° C. By way of further example, in one such embodiment lithium ion conductivity of ion conductor layer 10 varies less than about 4% upon cycling of the electrochromic device between a less transmissive state and a more transmissive state for at least 100 hours at 85° C. By way of further example, in one such embodiment lithium ion conductivity of ion conductor layer 10 varies less than about 3% upon cycling of the electrochromic device between a less transmissive state and a more transmissive state for at least 100 hours at 85° C. By way of further example, in one such embodiment lithium ion conductivity of ion conductor layer 10 varies less than about 2% upon cycling of the electrochromic device between a less transmissive state and a more transmissive state for at least 100 hours at 85° C. By way of further example, in one such embodiment lithium ion conductivity of ion conductor layer 10 varies less than about 1% upon cycling of the electrochromic device between a less transmissive state and a more transmissive state for at least 100 hours at 85° C. By way of further example, in one such embodiment lithium ion conductivity of ion conductor layer 10 varies less than about 0.5% upon cycling of the electrochromic device between a less transmissive state and a more transmissive state for at least 100 hours at 85° C.

Additionally, to enable electrochromic stack 28 to endure a range of physical stresses to which it may be exposed during the manufacture of electrochromic device 1, its incorporation into a structure (e.g., an automobile, aircraft, or building), and/or its intended end-use environment (e.g., as an architectural window, sunroof, skylight, mirror, etc., in such a structure), ion conductor layer 10 also possesses sufficient cohesion and adhesion to the first and second electrode layers 20, 21. For example, in one embodiment, ion conductor layer 10 has a lap shear strength of at least 100 kPa, as measured at 1.27 mm/min, at room temperature, in accordance with ASTM International standard D1002 or D3163. For example, in one embodiment ion conductor layer 10 has a lap shear strength of at least 200 kPa. By way of further example, in one such embodiment ion conductor layer 10 has a lap shear strength of at least 300 kPa. By way of further example, in one such embodiment ion conductor layer 10 has a lap shear strength of at least 400 kPa. By way of further example, in one such embodiment ion conductor layer 10 has a lap shear strength of at least 500 kPa. By way of further example, in one such embodiment ion conductor layer 10 has a lap shear strength of at least 600 kPa. Preferably, ion conductor layer 10 is elastically deformable. In one exemplary embodiment, ion conductor layer 10 has an elongation to failure of at least 1 mm.

Some non-exclusive examples of electrolytes typically incorporated into ion conductor layer 10 are: solid polymer electrolytes (SPE), such as poly(ethylene oxide) with a dissolved lithium salt; gel polymer electrolytes (GPE), such as mixtures of poly(methyl methacrylate) and propylene carbonate with a lithium salt; composite gel polymer electrolytes (CGPE) that are similar to GPE's but with an addition of a second polymer such a poly(ethylene oxide), and liquid electrolytes (LE) such as a solvent mixture of ethylene carbonate/diethyl carbonate with a lithium salt; and composite organic-inorganic electrolytes (CE), comprising an LE with an addition of titania, silica or other oxides. Some non-exclusive examples of lithium salts used are LiTFSI—$CF_3SO_2NLiSO_2CF_3$ (lithium bis(trifluoromethane) sulfonimide), $LiBF_4$ (lithium tetra fluoroborate), $LiAsF_6$ (lithium hexafluoro arsenate), $LiCF_3SO_3$ (lithium trifluoromethane sulfonate), and $LiClO_4$ (lithium perchlorate). Additional examples of suitable ion conducting layers include silicates, silicon oxides, tungsten oxides, tantalum oxides, niobium oxides, and borates. The silicon oxides include silicon-aluminum-oxide. These materials may be doped with different dopants, including lithium. Lithium doped silicon oxides include lithium silicon aluminum-oxide. In some embodiments, the ion conducting layer comprises a silicate based structure. In other embodiments, suitable ion conductors particularly adapted for lithium ion transport include, but are not limited to, lithium silicate, lithium aluminum silicate, lithium aluminum borate, lithium aluminum fluoride, lithium borate, lithium nitride, lithium zirconium silicate, lithium niobate, lithium borosilicate, lithium phosphosilicate, and other such lithium-based ceramic materials, silicas, or silicon oxides, including lithium silicon-oxide.

Electrochromic Multi-Layer Stack Anodes

In one embodiment, the electrochromic materials comprised by the anode electrode (i.e., the first or second electrode 20, 21; see FIG. 2) of a multi-layer stack of the present disclosure are inorganic or organometallic and the electrochromic materials comprised by the cathode (i.e., the other of the first or second electrode 20, 21; see FIG. 2) are independently inorganic or organometallic. More specifically, the electrochromic materials comprised by the anode and/or the cathode are inorganic or organometallic solid state materials with 3-D framework structures comprising metals bridged or separated by anionic atoms or ligands such as oxide, hydroxide, phosphate, cyanide, halide, that further comprise mobile ions such as protons, lithium, sodium, potassium that can intercalate and de-intercalate as the material is reduced or oxidized during the electrochromic cycle.

A variety of anodically coloring films comprising Ni, Ir, and Fe are known in the art and can be prepared by a number of deposition processes including vapor deposition processes, wet-coating processes, spray coating processes, dip coating, and electrodeposition. Many of these anodic films are mixed metal oxides where lithium or protons are intercalated to balance charge during cycling. Additionally, non-oxide based films such as Prussian blue materials can be useful as anodic electrochromic films. In one embodiment, anodically coloring films include oxides, hydroxides and/or oxy-hydrides based on nickel, iridium, iron, chromium, cobalt and/or rhodium.

Electrochromic Multi-Layer Stack Substrates

The "substrate" comprises an electrically conductive layer 22, 23, and an "outer substrate" 24, 25. In some embodiments, the electrically conductive layer is selected from a group consisting of: transparent conductive oxides, thin metallic coatings, networks of conductive nanoparticles (e.g., rods, tubes, dots), conductive metal nitrides, and composite conductors.

In some embodiments, the outer substrate is selected from a group consisting of: glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

Electrochromic Devices Containing Tungsten Oxide Thin Films

The thickness of the ion conductor layer 10 will vary depending on the material. In some embodiments using an inorganic ion conductor, the ion conductor layer 10 is about 250 nm to 1 nm thick, preferably about 50 nm to 5 nm thick. In some embodiments using an organic ion conductor, the ion conductor layer is about 1000000 nm to 1000 nm thick or about 250000 nm to 10000 nm thick. The thickness of the ion conductor layer is also substantially uniform. In one embodiment, a substantially uniform ion conductor layer varies by not more than about +/−10% in each of the aforementioned thickness ranges. In another embodiment, a substantially uniform ion conductor layer varies by not more than about +/−5% in each of the aforementioned thickness ranges. In another embodiment, a substantially uniform ion conductor layer varies by not more than about +/−3% in each of the aforementioned thickness ranges.

In one embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then be placed in a vacuum laminator and heated under vacuum to form a sealed assembly. Polymerization of the monomer/comonomer may be initiated either thermally or photochemically. In one embodiment, any thermal processing of the device, particularly one where the substrate is plastic, is below the temperature of 200° C., and more particularly 150° C., and even more particularly 100° C.

Alternatively, free standing, fully formulated ion-conducting films may be used in place of the crosslinking IC formulation or the liquid IC formulation may be used in a "cast in place" process where a pre-formed cavity between the anode and cathode is produced (edge sealed) and the formulation is forced into this cavity through fill ports.

The thickness of anode layer 20 and cathode layer 21 will depend upon the electrochromic material selected for the electrochromic layer and the application. In some embodiments, anode layer 20 will have a thickness in the range of about 25 nm to about 2000 nm. For example, in one embodiment anode layer 20 has a thickness of about 50 nm to about 2000 nm. By way of further example, in one embodiment anode layer 20 has a thickness of about 25 nm to about 1000 nm. By way of further example, in one such embodiment, anode layer 20 has an average thickness between about 100 nm and about 700 nm. In some embodiments, anode layer 20 has a thickness of about 250 nm to about 500 nm. Cathode layer 21 will typically have thicknesses in the same ranges as those stated for anode layer 20. One of skill in the art will appreciate that certain relationships exist between the thickness of the anode or cathode layer, and the materials deposited to comprise the anode or cathode layer. For example, if the average thickness of the anode or cathode layer is between about 250 nm to about 500 nm, then anode or cathode precursor materials that comprise the liquid mixtures used to deposit the anode or cathode layers will likely be composed of species that are smaller than 250 nm to 500 nm.

Electrically conductive layer 22 is in electrical contact with one terminal of a power supply (not shown) via bus bar 26 and electrically conductive layer 23 is in electrical contact with the other terminal of a power supply (not shown) via bus bar 27 whereby the transmissivity of electrochromic device 1 may be changed by applying a voltage pulse to electrically conductive layers 22 and 23. The pulse causes electrons and ions to move between anode layer 20 and cathode layer 21 and, as a result, the anode layer 20 and, optionally, cathode layer 21 change(s) optical states, thereby switching electrochromic device 1 from a more transmissive state to a less transmissive state, or from a less transmissive state to a more transmissive state. In one embodiment, electrochromic device 1 is transparent before the voltage pulse and less transmissive (e.g., more reflective or colored) after the voltage pulse or vice versa.

Referring again to FIG. 2, the power supply (not shown) connected to bus bars 26, 27 is typically a voltage source with optional current limits or current control features and may be configured to operate in conjunction with local thermal, photosensitive or other environmental sensors. The voltage source may also be configured to interface with an energy management system, such as a computer system that controls the electrochromic device according to factors such as the time of year, time of day, and measured environmental conditions. Such an energy management system, in conjunction with large area electrochromic devices (e.g., an electrochromic architectural window), can dramatically lower the energy consumption of a building.

At least one of the substrates 24, 25 is preferably transparent, in order to reveal the electrochromic properties of the stack 28 to the surroundings. Any material having suitable optical, electrical, thermal, and mechanical properties may be used as first substrate 24 or second substrate 25. Such substrates include, for example, glass, plastic, metal, and metal coated glass or plastic. Non-exclusive examples of possible plastic substrates are polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers. If a plastic substrate is used, it may be barrier protected and abrasion protected using a hard coat of, for example, a diamond-like protective coating, a silica/silicone anti-abrasion coating, or the like, such as is well known in the plastic glazing art. Suitable glasses include either clear or tinted soda lime glass, chemically tempered soda lime glass, heat strengthened soda lime glass, tempered glass, or borosilicate glass. In some embodiments of electrochromic device 1 with glass, e.g. soda lime glass, used as first substrate 24 and/or second substrate 25, there is a sodium diffusion barrier layer (not shown) between first substrate 24 and first electrically conductive layer 22 and/or between second substrate 25 and second electrically conductive layer 23 to prevent the diffusion of sodium ions from the glass into first and/or second electrically conductive layer 23. In some embodiments, second substrate 25 is omitted.

Independent of application, the electrochromic structures of the present disclosure may have a wide range of sizes. In general, it is preferred that the electrochromic device comprise a substrate having a surface with a surface area of at least 0.001 meter$^2$. For example, in certain embodiments, the electrochromic device comprises a substrate having a surface with a surface area of at least 0.01 meter$^2$, or at least 0.1 meter$^2$, or at least 1 meter$^2$, or at least 5 meter$^2$, or at least 10 meter$^2$.

At least one of the two electrically conductive layers 22, 23 is also preferably transparent in order to reveal the electrochromic properties of the stack 28 to the surroundings. In one embodiment, electrically conductive layer 23 is transparent. In another embodiment, electrically conductive layer 22 is transparent. In another embodiment, electrically conductive layers 22, 23 are each transparent. In certain embodiments, one or both of the electrically conductive layers 22, 23 is inorganic and/or solid. Electrically conductive layers 22 and 23 may be made from a number of different transparent materials, including transparent conductive oxides, thin metallic coatings, networks of conductive nanoparticles (e.g., rods, tubes, dots), conductive metal nitrides, and composite conductors. Transparent conductive oxides include metal oxides and metal oxides doped with one or more metals. Examples of such metal oxides and doped metal oxides include indium oxide, indium tin oxide, doped indium oxide, tin oxide, doped tin oxide, zinc oxide, aluminum zinc oxide, doped zinc oxide, ruthenium oxide, doped ruthenium oxide and the like. Transparent conductive oxides are sometimes referred to as (TCO) layers. Thin metallic coatings that are substantially transparent may also be used. Examples of metals used for such thin metallic coatings include gold, platinum, silver, aluminum, nickel, and alloys of these. Examples of transparent conductive nitrides include titanium nitrides, tantalum nitrides, titanium oxynitrides, and tantalum oxynitrides. Electrically conducting layers 22 and 23 may also be transparent composite conductors. Such composite conductors may be fabricated by placing highly conductive ceramic and metal wires or conductive layer patterns on one of the faces of the substrate and then over-coating with transparent conductive materials such as doped tin oxides or indium tin oxide. Ideally, such wires should be thin enough as to be invisible to the naked eye (e.g., about 100 µm or thinner). Non-exclusive examples of electron conductors 22 and 23 transparent to visible light are thin films of indium tin oxide (ITO), tin oxide, zinc oxide, titanium oxide, n- or p-doped zinc oxide and zinc oxyfluoride. Metal-based layers, such as ZnS/Ag/ZnS and carbon nanotube layers have been recently explored as well. Depending on the particular application, one or both electrically conductive layers 22 and 23 may be made of or include a metal grid.

The thickness of the electrically conductive layer may be influenced by the composition of the material comprised within the layer and its transparent character. In some embodiments, electrically conductive layers 22 and 23 are transparent and each have a thickness that is between about 1000 nm and about 50 nm. In some embodiments, the thickness of electrically conductive layers 22 and 23 is between about 500 nm and about 100 nm. In other embodiments, the electrically conductive layers 22 and 23 each have a thickness that is between about 400 nm and about 200 nm. In general, thicker or thinner layers may be employed so long as they provide the necessary electrical properties (e.g., conductivity) and optical properties (e.g., transmittance). For certain applications it will generally be preferred that electrically conductive layers 22 and 23 be as thin as possible to increase transparency and to reduce cost.

Referring again to FIG. 2, the function of the electrically conductive layers is to apply the electric potential provided by a power supply over the entire surface of the electrochromic stack 28 to interior regions of the stack. The electric potential is transferred to the conductive layers though electrical connections to the conductive layers. In some embodiments, bus bars, one in contact with first electrically conductive layer 22 and one in contact with second electrically conductive layer 23 provide the electrical connection between the voltage source and the electrically conductive layers 22 and 23.

In one embodiment, the sheet resistance, $R_s$, of the first and second electrically conductive layers 22 and 23 is about 500Ω/□ to 1Ω/□. In some embodiments, the sheet resistance of first and second electrically conductive layers 22 and 23 is about 100Ω/□ to 5Ω/□. In general, it is desirable that the sheet resistance of each of the first and second electrically conductive layers 22 and 23 be about the same. In one embodiment, first and second electrically conductive layers 22 and 23 each have a sheet resistance of about 20Ω/□ to about 8 Ω/□.

In some embodiments, the cathode of an electrochromic device comprises hexagonal tungsten trioxide or pyrochlore. In some embodiments, the cathode of an electrochromic device comprises hexagonal tungsten trioxide or pyrochlore synthesized by hydrothermal synthesis.

In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate. In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, without the addition of a binder.

In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate has a melting point less than 800° C., or less than 700° C., or less than 600° C., or less than 500° C., or less than 400° C., or less than 300° C., or less than 250° C., or less than 200° C., or less than 150° C., or less than 100° C., or from 100° C. to 200° C., or from 200° C. to 300° C., or from 300° C. to 400° C., or from 400° C. to 500° C., or from 500° C. to 600° C., or from 600° C. to 700° C., or from 700° C. to 800° C., or from 800° C. to 900° C., or from 900° C. to 1000° C., or from 1000° C. to 1100° C., or from 1100° C. to 1200° C., or from 1200° C. to 1300° C., or from 1300° C. to 1400° C., or from 1400° C. to 1500° C., or from 1500° C. to 1600° C. In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the tungsten trioxide or pyrochlore nanostructures on a substrate, wherein the substrate has a glass transition temperature less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C. In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the tungsten trioxide or pyrochlore nanostructures on a substrate, wherein the substrate has a softening point less than 1000° C., or less than 900° C., or less than 800° C., or less than 700° C., or less than 600° C., or less than 500° C., or less than 400° C., or less than 300° C., or less than 250° C., or less than 200° C., or less than 150° C., or less than 100° C., or from 75° C. to 125° C., or from 125° C. to 175° C., or from 175° C. to 225° C., or from 225° C. to 275° C., or from 275° C. to 325° C., or from 325° C. to 375° C., or from 375° C. to 425° C., or from 425° C. to 500° C., or from 500° C. to 600° C., or from 600° C. to 700° C., or from 700° C. to 800° C., or from 800° C. to 900° C.

In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate is thicker than 50 microns.

In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate comprises an electrically conducting layer and outer substrate, and the material of the outer substrate is selected from the group consisting of: glass (e.g. soda lime glass or borosilicate glass), and plastic (e.g. polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates and cellulose-based polymers).

In some embodiments, a method of producing the cathode of an electrochromic device comprises synthesizing hexagonal tungsten trioxide or pyrochlore particles by hydrothermal synthesis; size-reducing the hexagonal tungsten trioxide or pyrochlore particles by grinding to produce crystalline hexagonal tungsten trioxide or pyrochlore nanostructures; and coating the hexagonal tungsten trioxide or pyrochlore nanostructures on a substrate, wherein the substrate comprises an electrically conducting layer and outer substrate, and the material of the electrically conductive layer is selected from a group consisting of: transparent conductive oxides, thin metallic coatings, networks of conductive nanoparticles (e.g., rods, tubes, dots), conductive metal nitrides, and composite conductors.

In some embodiments, EC devices with hexagonal tungsten trioxide or pyrochlore cathodes have fast switching speeds. Not to be limited by theory, the large channels in the crystal structure of hexagonal tungsten trioxide enables a high ionic mobility for the intercalated ions (e.g. Li+).

The electrochromic devices incorporating the nanostructures described in this disclosure may also be particle-based electrochromic devices. A particle-based electrochromic device is an electrochromic structure where one or more of the functional layers is formed of nanoparticles or nanostructures, such as those described above. The functional layers include the transparent conductive layers, the electrodes (anode and or cathode), and the ion conductor. An electrochromic particle-based system is one where the particles or nanoparticles in such a system are solid state materials with an extended solid state crystal structure and have substitutable atoms such as metals and ligands that can be substituted to tune the electrochromic properties. A unit cell of the crystal structure is the smallest repeatable unit within that structure and can be used both to describe the contents of the crystal and to estimate the number of atoms and/or unit cells in a particle of a given size. The number of atoms/unit cells in a particle can be estimated based on known bond lengths between different atoms and the positions of the atoms in the unit cells. The electrochromic particles may range from 1-200 nm at the largest and 10-50 nm as a more preferred range.

Although a range of electrochromic materials could be used in particle-based electrochromic systems, there is a need for anode films that can be prepared by simple low temperature single-step deposition processes to produce electrochromic electrodes (i.e., electrochromic cathodes, electrochromic anodes or electrochromic anodes and cathodes) with improved thermal stability, high optical clarity in their as-deposited states, and that can be tuned via composition and film thickness to adopt a wide variety of area charge capacities and optical switching properties.

In general, the particle-based systems may be tuned to obtain electrochromic materials (EC systems) that reversibly change from a transparent state having a good $T_{vis}$ to a dark color having a high coloration efficiency. In various embodiments of this invention, the electrochromic properties that may be tuned are:

a. Bleached state of material: Transparent, clear color
b. Dark state of material: The desired color can vary based on the different purposes, but for EC windows the color may be anything pleasing to the human eye in the dark state (e.g. "night sky" grey-blue). Both of the electrodes (anode and cathode) can contribute to the color of the dark state or only one of the electrodes can be coloring. In the instance where both anode and cathode are contribute to the color of the final EC device, then the color tuning may be performed to match one to the other to create an overall color for the dark state. The color may be based on a standard such as a CIE L*a*b* value. In particular, b* should be less than 10.
c. Coloration efficiency: A deep dark color is desired in the dark state, as opaque as possible. Therefore, a high coloration efficiency is desired.
d. Switching speed: A fast switching speed between oxidized and reduced states, where the transparent state is 5% or less in the transparent state when switched and the dark state is at least 65% darkened.
e. Voltage matching of the anode and cathode in the final EC device.
f. Anode: Want dark colored oxidized state and a clear/transparent reduced state
g. Cathode: Want clear/transparent oxidized state and dark colored reduced state Both anodic and cathodic electrochromic particle-based materials may be tuned for any of the above properties using methods of substituting metals and ligands. Of particular interest is tuning the color of the electrochromic particle-based materials. The particle-based cathode material may be any of the tungsten oxide nanostructures described in this disclosure. The particle-based anode materials may be any material compatible with the other materials selected as part of the electrochromic device, from a chemical compatibility standpoint as well as from a device functionality standpoint. Chemically the materials should be compatible in that they do not detrimentally interact with one another. From a device functionality standpoint the device materials can be selected to provide a device that performs within parameters determined to be optimal for the various products into which it may be integrated. For example the anode and cathode may be selected to have dark-state colors that combine to provide a desired color. In another example the materials may be selected to provide a particular switching speed or coloration efficiency.

Prussian blue (iron(III) hexacyanoferrate(II)) and Prussian blue analogues (metal hexacyanometallates) are examples of electrochromic materials that could be used for the anodes in electrochromic devices. Prussian Blue is the commonly used name for Iron Hexacyanoferrate or $Fe_4[Fe$ (CN)$_6$]$_3$·xH$_2$O (x is commonly described as a range 10-14). A Prussian Blue Analog=(M$^1$, M$^2$)$_x$[M$^3$,M$^4$(CN)$_{6-y}$L$_y$]$_z$.

In the formation of Prussian Blue, the addition of Fe$^{3+}$ to hexacyanoferrate(II) in water simultaneously precipitates the product with a quantitative yield as agglomerates of nanocrystals (10-20 nm). Cyanide-bridging between the two octahedral Fe ions of Prussian Blue extends to a cubic framework, containing water and some of alkaline cations in the pores. This open-framework enables the Prussian blue iron-cyanide complex to perform a charge/discharge process of mobile cations without causing significant stress to the scaffold. In addition, a highly intense blue color stemming from the intervalent charge-transfer between Fe$^{2+}$ and Fe$^{3+}$ centers is beneficial in achieving high coloration efficiency at its dark state color. Upon the chemical- or electrochemical-reduction of Fe$^{3+}$ to Fe$^{2+}$, the material readily loses its blue color and turning to translucent state, which affords a great clarity at the bleached state. In one embodiment, the anode material may be a Prussian blue analog possessing relatively high coloration efficiency at relatively low voltages, and having a hue (or a CIE L*a*b* value) that provides the desired dark-state color in the electrochromic device.

Electrochromic behavior of Prussian blue thin films have been studied with aqueous or non-aqueous electrolyte solutions with various mobile cations such as H$^+$, Li$^+$, Na$^+$, K$^+$, and NH$_4^+$. It is well known that it performs fast and stable switching between blue and colorless states, with only slight deterioration over many cycles. In addition, the voltage range closely matches to that of cathodic WO$_3$, which affords fairly fast and stable switching in the devices. Indeed, excellent cell-durability over 20,000 cycles has been reported from an electrochromic device composed of a Prussian blue anode and a WO$_3$ cathode that were laminated with a proton-based ion conductor between them.

Despite the fast and stable electrochromic switching of Prussian blue, the dark state color is aesthetically less than ideal for some applications such as residential, commercial, or automobile windows. For example, when matched to a WO$_3$ cathode in an electrochromic device, the device colors to an intense blue at the dark state, representing a large b* (b-star) measurement as defined in the "Lab" color space. A Lab color space is a color-opponent space with dimension L for lightness and a* and b* for the color-opponent dimensions, based on nonlinearly compressed (e.g. CIE XYZ color space) coordinates. To improve the color to a different regime (e.g., to reduce b* and increase L in the L*,a*,b* color space), it has been proposed to substitute a range of transition metals for iron to form various Prussian blue analogues.

Substitutions of metals or ligands will change the size of the unit cells in a somewhat predictable manner. For example, we can substitute metals in tungsten oxide materials or Prussian blue analog materials, and as we substitute those metals the bond lengths between metals and ligands may change somewhat. As a consequence, unit cell sizes within the particles may change to some extent.

Prussian Blue is a framework structure with octahedrally coordinated metals surrounded by cyanide ligands. Due to the directional nature of the cyanide ligand, the structure can be further described as having metal atoms octahedrally coordinated by the cyanide carbon atom and other metal atoms octahedrally coordinated by the cyanide nitrogen atom continuing in 3 dimensions.

Prussian Blue Analog as used herein is a broad term to describe any framework structure similar to Prussian Blue where metal atoms are coordinated octahedrally by ligands arranged in a face-centered cubic or similar symmetry. Often the ligands are cyano (CN) groups (y=0) but the cyano groups can be replaced by other ligands. The substituted ligand L can be any ligand from the spectroelectrochemical series but in particular any ligand that is similar to a cyano (CN) group in terms of size, electronic properties, and/or geometry.

There are some types of Prussian Blue Analogs that have well-known names, such as those including the Nitroprusside anion [Fe(CN)$_5$NO]$^{2-}$ and Iron Nitroprusside (Iron Pentacyanonitrosylferrate=Fe[Fe(CN)$_5$NO]), which has a similar structure to Prussian Blue with 1 cyanide group replaced by a nitrosyl group.

Prussian Blue Analogs refer to embodiments where metals, ligands, both metals and ligands simultaneously, precursors, solvents and general synthetic methods have been manipulated with the intent of modifying color, durability, transmissivity, switching speed and/or particle size, ease of dispersing in a solvent, ease and quality of coating a dispersion, ease or cost of synthesizing a material, temperature, environment of preparation or other meaningful synthesis, materials, formulation and device properties, as necessary.

In one embodiment, this involves the substitution of metals or ligands in Prussian blue analogs having the formula (M1, M2)x[M3,M4(CN)6-yLy]z. Any of the metals 1-4 may be substituted in any variation, either with or without iron (Fe) as one of the metals. There may be a single metal used in the analog or up to 4 different metals in a mixed metal analog. The substitution of the metal bonded to the carbon or analogous atom inside of the brackets may have different effects than the substitution of the metals on the outside of the brackets (the Nitrogen or analogous atom of the ligand.) Metals that may be use in the substitution include any of the transition metals, and particular examples include titanium, manganese, ruthenium, vanadium, nickel, cobalt, copper, palladium, indium, cadmium, chromium, molybdenum, osmium, platinum, rhenium, rhodium, silver, zinc, and zirconium.

In one embodiment, the metals were varied in the Prussian Blue analog M[FexCr1-x(CN)6]. The metal M was varied between iron (Fe2+), Cobalt (Co2+), Copper (Cu2+), and manganese (Mn2+). For each of these metal M variations the mole fraction of each hexacyanometallate (the Fe and Cr inside of the brackets) was varied as the following ratio of Fe to Cr: 0 to 1, 0.2 to 0.8, 0.4 to 0.6, and 0.8 to 0.2. This resulted in a wide range of colors for the particle-based Prussian blue analog dispersion. Colors observed included reds, browns, blues, and clear. These were each reduced using Na2SO3 to colors including reds, oranges, yellows, and whites. This experiment demonstrates the color tuning methodology that may be performed to identify particles having different colors in both oxidized and reduced states.

In another embodiment, the metals were varied in the Prussian Blue analog M[Mn(CN)6] which demonstrated different shades of brown in the oxidized state and white in the reduced state. M was varied with substitutions of Cobalt, Manganese, Copper, and Iron and chemically reduced by Na2SO3. The Cu[Mn(CN)$_6$] version showed a promising oxidized state color of very dark brown and a reduced state of white, which may be of value to use in an electrochromic device used for windows.

Another color-tuning approach that was tried was the "core-shell" method were a "core" solid particles of Prussian Blue, Mn[Fe(CN)$_6$], Zn[Fe(CN)$_6$], Ni[Fe(CN)$_6$], and Co[Fe(CN)$_6$]. Each of these "core" compounds were mixed with cations of "shell" metals including silver, cerium, cobalt, copper, chromium, iron (II and III), Indium, Manganese, and titanium (II and III.) The cations on the outside of the electrochromic particles had an effect on the color of the oxidized and reduced solution. In the oxidized state the colors ranged from browns, to oranges, to yellows, to whites, to greens, and to blues.

In another embodiment, the ligands (L) may be substituted in combination with variations of the metals or independently of the metal substitution, and up to five of the ligands (L) may be substituted with ligands other than the cyano (CN) groups. The ligands substituted may be any from the spectroelectrochemical spectrum, and more particularly any that are high on the spectroelectrochemical spectrum. In specific embodiments, the ligands may be substituted with ligands that are similar in structure, both electronically and geometrically, to a cyano (CN) group such as Nitrosyl (NO), Carbonyl (CO), Halide (Cl, Br, F, I), isocyanate, and thiocyanide.

The ion conductor material used in particle-based electrochromic devices in one embodiment may be produced from a liquid formulation that comprises an electrolyte solvent or plasticizer, a polymerizable monomer or set of monomers, an optional polymerization initiator, and a salt such as a lithium salt or an acid. The formulation may also comprise other additives to promote device performance such as pH buffers, UV stabilizers, and the like. In another embodiment, the ion-conducting film is produced from the ion conducting formulation by depositing the liquid formulation with the anode film, cathode film, or both films in a sufficient quantity to form a continuous pre-crosslinked film having a uniform thickness between 50 and 500 microns between the anode and cathode plates. This assembly may then placed in a vacuum laminator and heated under vacuum to form a sealed assembly. Polymerization of the monomer/comonomer may be initiated either thermally or photochemically. In one embodiment, any thermal processing of the device, particularly one where plastic is as the substrate, is below the temperature of 200° C., and more particularly 150° C., and even more particularly 100° C.

Alternatively, free standing fully formulated ion-conducting films may be used in place of the crosslinking IC formulation or the liquid IC formulation may be used in a "cast in place" process where a pre-formed cavity between the anode and cathode is produced (edge sealed) and the formulation is forced into this cavity through fill ports. Typical monomers used in these formulations are polar organic olefins such as acrylates, or other well-known polymerization systems such as silicones, urethanes and the like.

In an alternative embodiment, the structure of the electrochromic device may employ a symmetric electrode assembly, where each of the electrode layers include a mixture of both anode and cathode electrochromic particles.

In another embodiment, the EC device may be formed by a combination of both anodic and cathodic particles dispersed in a single layer between two conductive layers where at least one of the anodic or cathodic particles are transparent in both oxidized and reduced states so that the color is created by only one of the anodic or cathodic particles.

Particle-based formulations for the different components in electrochromic devices allows for alternative techniques for making EC devices having the components described above including the anode, cathode, ion conductor, and the transparent conductive layers. A particle-based coating technology may also enable novel device architectures to exploit the potential for greatly reduced device complexity, growing EC films post-deposition (of particular value for curved applications), and post-device completion defect repair.

In one embodiment the particle-based devices and techniques may be mixed-particle films, such as anode materials mixed with cathode materials to produce a film that functions as both. In another embodiment the mixed particle films may be formed of non-electrochromic particles mixed with electrochromic particles in a binder material to enhance specific properties, where the non-electrochromic particles may be charge sequestration particles or additives to increase the ionic or electronic conductivity of the device. The binder may be an organic material that is both adhesive and ion-conducting. The transparent conductive layer (TCL) may also be particle-based and be incorporated into an adhesive film. The TCL particles may be approximately 2 microns and create a resulting TCL film having a sheet resistance of about 50 ohm/square to about 100 ohm/square. A particle based TCL with high transparency and low haze but with low conductivity can also be used in these types of systems due to the thinness of the TCL's. This is because any total conductivity can be achieved by layering the TCL layers. For Example, 10 stacked 5 layer devices with TCL films having 250 ohm/sq would have net 25 ohm/sq resistance. Thus, exceptional film performance with relatively low volumetric charge capacity—and thus less need for a high conductivity TCL. This is valuable because the high conductivity TCL's are more expensive.

An example of a mixed-particle device may have the TCL adhesive film sandwiching an adhesive ion conducting film which incorporates both anode and cathode particles. Alternatively there may be two adhesive ion conducting films sandwiched between the TCL adhesive film, where one of the adhesive ion conducting films incorporates the anode material and the other adhesive ion conducting film incorporates the cathode material. There may be more than two of the electrode and ion conducting adhesive films present in these types of devices in order to provide multiple discrete electrochromic layers. Roll to roll processing using flexible films would enable efficient processing of such devices.

EXAMPLES

The following non-limiting examples are provided to further illustrate the present disclosure. It should be appreciated by those of skill in the art that the techniques disclosed in the examples that follow represent approaches the inventors have found function well in the practice of the disclosure, and thus can be considered to constitute examples of modes for its practice. However, those of skill in the art should, in light of the present disclosure, appreciate that many changes can be made in the specific embodiments that are disclosed and still obtain a like or similar result without departing from the spirit and scope of the disclosure.

Example 1

Hydrothermal Synthesis of Hexagonal Tungsten Trioxide Nanostructures

Figure 3A:
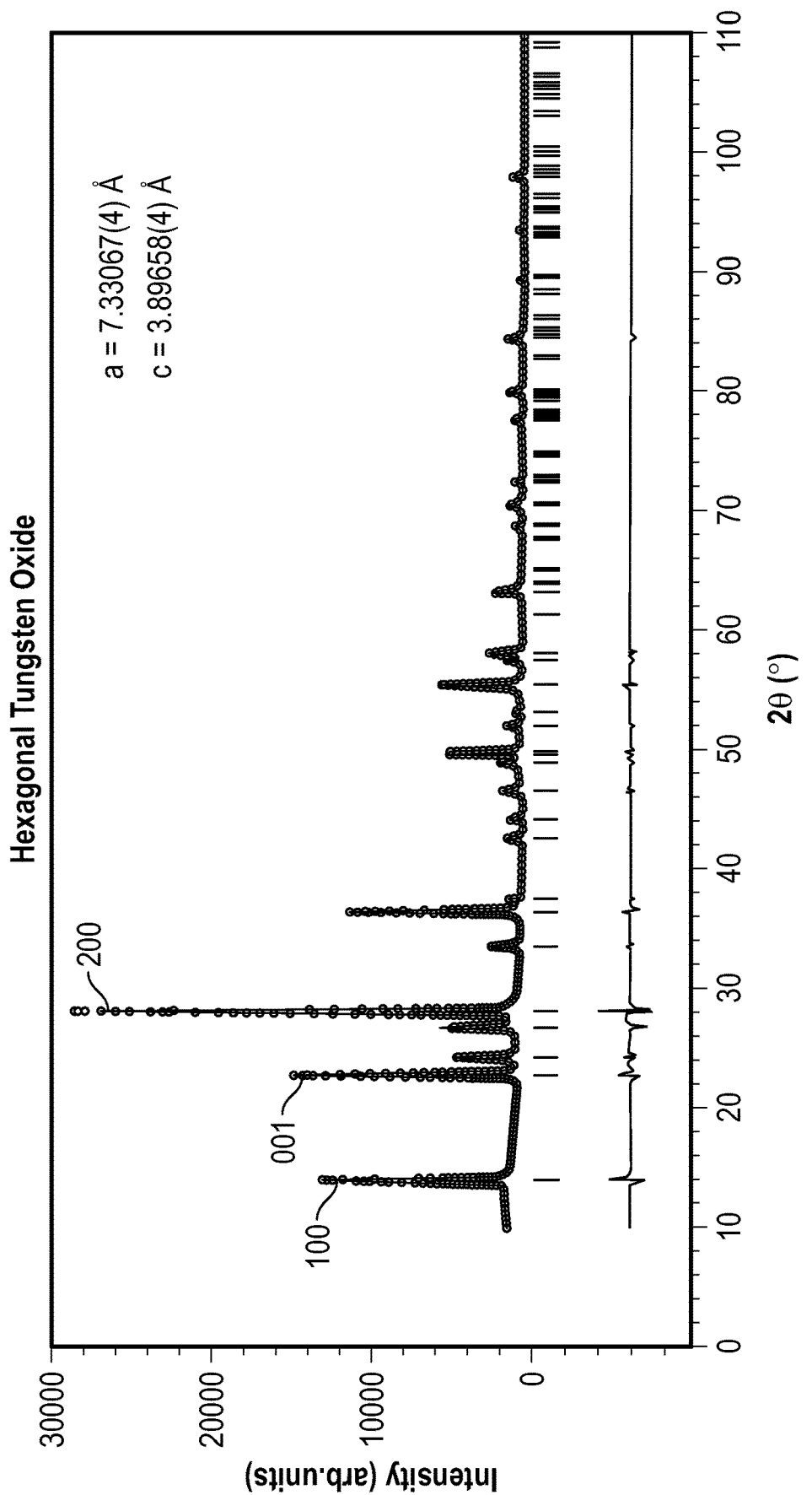
FIG. 3a illustrates an x-ray diffraction pattern for hexagonal tungsten oxide, produced by hydrothermal synthesis methods.

FIG. 3a shows an example x-ray diffraction (XRD) pattern of hexagonal tungsten trioxide particles prepared using hydrothermal synthesis. This XRD pattern of the as-synthesized product may be fit to a crystal structure of the space group P6/mmm (#191), where the lattice parameters are a=b=approximately 7.3 (Angstroms), and c=approximately 3.9 (Angstroms). The hexagonal tungsten trioxide particles were prepared according to the following procedure.

A 125 mL steel autoclave vessel with a Teflon insert is used. 5.0 g of $Na_2WO_4 \cdot 2H_2O$ and 1 g of NaCl is added to 45 ml of DI $H_2O$. The pH is monitored, and the starting pH is typically 9.1 to 9.3. 3M HCl is rapidly added, until the pH is equal to 1.5, and the solution turns a light green color. The reaction mixture is then loaded into the autoclave vessel, and heated to 180° C. for 6 hours.

After the reaction products cool to room temperature, the supernatant liquid is discarded, and the precipitate product is collected into a centrifuge tube using DI water. DI water is used to dilute the product to a total of about 45 mL, and then centrifuged at 4500 RPM for 4 min. The supernatant is again discarded, and DI $H_2O$ is added to the precipitate to get 25 mL total volume. A second centrifuge procedure is performed at 4500 RPM for 4 min. The supernatant is again discarded, and the centrifuge procedure is repeated two more times, diluting each time with isopropanol. After decanting the isopropanol, the centrifuge tubes are dried in a vacuum environment. After drying, the powder is ground with a mortar and pestle and is further dried before the XRD pattern in FIG. 3a was taken. The yield of the hexagonal tungsten trioxide from this process is typically 3.2 (+/−0.1) g.

The x-ray diffraction (XRD) pattern in FIG. 3a shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2Θ with a step size of 0.01°. Intensities of the (100), (001) and (200) peaks indicate that the crystallinity does not have a preferred orientation. In contrast, nanowires would typically show a preferred orientation, indicating that the material formed does not have the crystalline structure of nanowires.

Example 2

Hydrothermal Synthesis of Pyrochlore Nanostructures

Figure 3B:
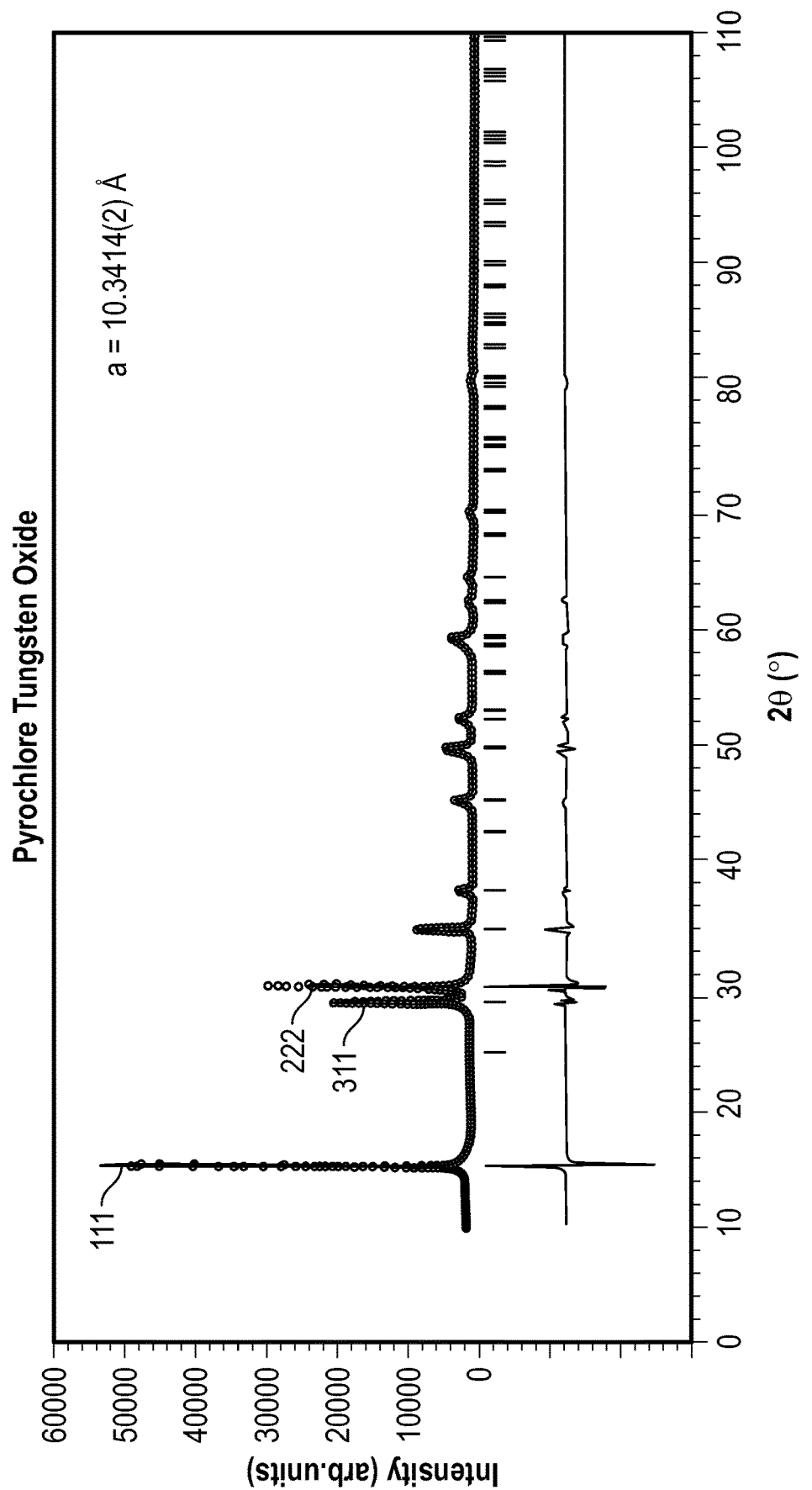
FIG. 3b illustrates an x-ray diffraction pattern for pyrochlore tungsten oxide, produced by hydrothermal synthesis methods.

FIG. 3b shows an example x-ray diffraction (XRD) pattern of pyrochlore particles prepared using hydrothermal synthesis. This XRD pattern of the as-synthesized product may be fit to a crystal structure of the space group Fd-3 m, (#227) where the lattice parameters are a=b=c approximately 10.3 (Angstroms), The pyrochlore particles were prepared according to the following procedure.

A 2 L autoclave vessel with a Glass insert is used. 80.0 g of $Na_2WO_4 \cdot 2H_2O$ and 16 g of NaCl is added to 720 ml of DI $H_2O$. The pH is monitored, and the starting pH is typically 10.1 to 10.3. 3M HCl is rapidly added, until the pH is equal to 3.5. The reaction mixture is then loaded into the autoclave vessel, and heated to 200° C. for 12 hours.

After the reaction products cool to room temperature, the supernatant liquid is discarded, and the precipitate product is collected into a centrifuge tube using DI water. DI water is used to dilute the product to a total of about 500 mL, and then centrifuged at 4500 RPM for 4 min. The supernatant is again discarded, and DI $H_2O$ is added to the precipitate to get about 500 mL total volume. A second centrifuge procedure is performed at 4500 RPM for 4 min. The supernatant is again discarded, and the centrifuge procedure is repeated again with isopropanol to a similar volume. After decanting the isopropanol, the centrifuge tubes are dried in a vacuum environment. After drying, the powder is ground with a mortar and pestle and is further dried before the XRD pattern in FIG. 3b was taken. The yield of the pyrochlore from this process is typically 20 (+/−0.1) g.

The x-ray diffraction (XRD) pattern in FIG. 3b shows narrow peaks, indicating a high degree of crystallinity. Samples were analyzed using a Bruker D8 Advance diffractometer employing CuKα radiation. Scans were made in Bragg-Brentano geometry using a Ni filter between 5-110° 2Θ with a step size of 0.01°.

Example 3

Size Reduction of Hexagonal Tungsten Trioxide Nanostructures

Figure 4A:
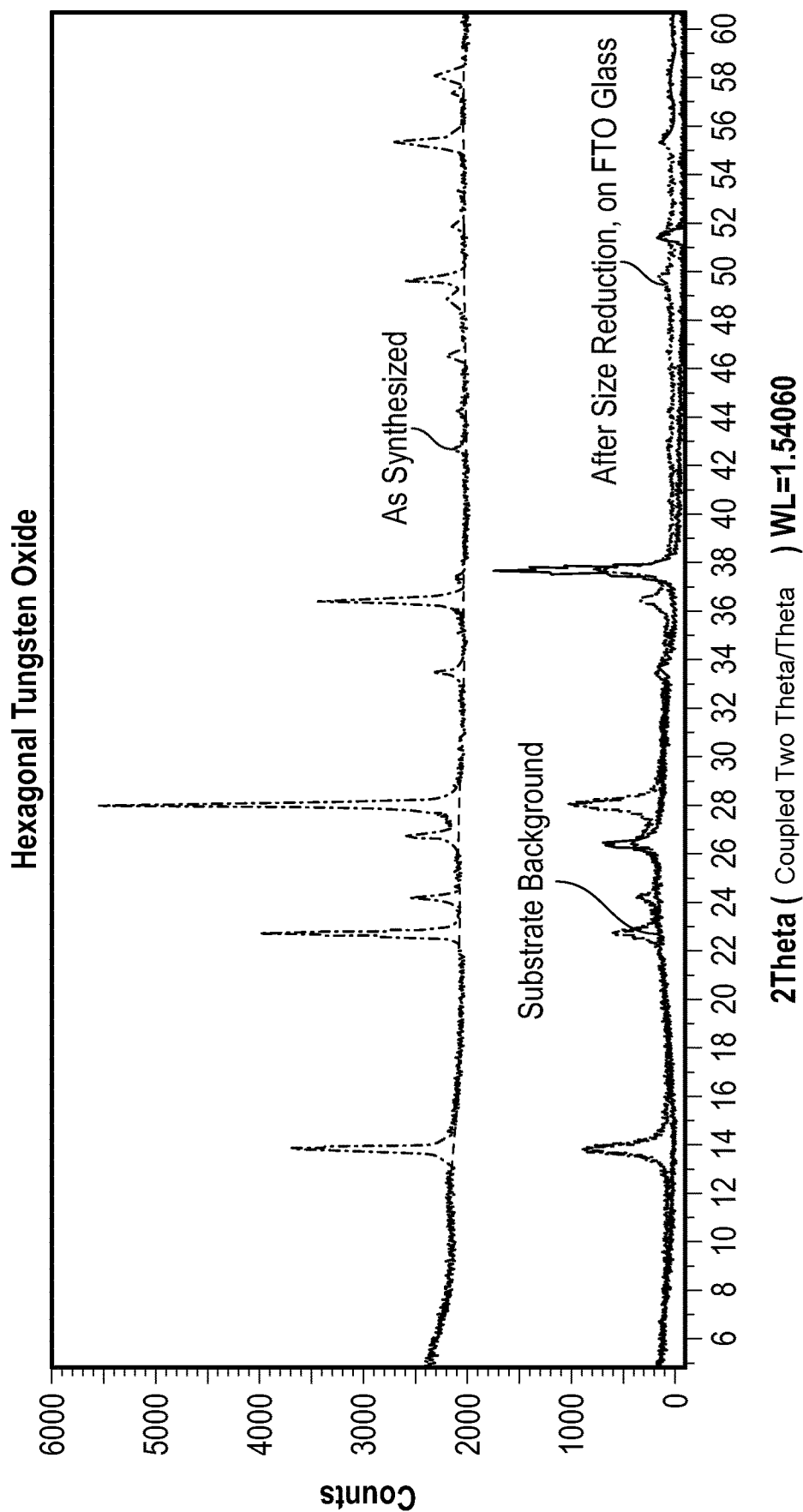
FIG. 4a illustrates an x-ray diffraction pattern for a hexagonal tungsten oxide powder sample, produced by hydrothermal synthesis methods, and the same powder coated on an FTO coated glass substrate after size-reduction.

FIG. 4a shows an XRD pattern of the hexagonal tungsten trioxide "starting material" (i.e. the as-synthesized material as described in Example 1), and the materials after size reducing and coating on a substrate. Samples were analyzed using a Bruker D8 Advance diffractometer employing CuKα radiation. Scans were made in Bragg-Brentano geometry using a Ni filter between 5-110° 2Θ with a step size of 0.01°. In this example, the dried powder (as described in Example 1) is size-reduced by grinding using an agitator bead mill. The mill has 80 mL bowls with $ZrO_2$ liners. The milling media are 0.1 mm diameter $ZrO_2$ balls. The primary particle size of the starting material is approximately between 5 and 500 nm, however, agglomerates from 1 to 20 microns are also observed.

6.4 (+/−0.1) g of hexagonal tungsten trioxide material to be size-reduced by milling (e.g., product from 2 reaction batches using the synthetic procedure described in Example 1) is added to 30 mL of IPA (isopropanol) and 100 (+/−1) g of 0.1 mm $ZrO_2$ balls, in the bowl of the mill. The milling cycle parameters are 500 RPM for 3 min, followed by 5-9 min of rest time (to allow the mill bowls to cool). The cycle is repeated 20 times, for a total of 1 hour active milling time. The formulation is then extracted from milling bowls and filtered to separate the milling media from the formulation.

Additional IPA is then added to the milling bowls and the mixture is shaken and sonicated to remove any remaining hexagonal tungsten trioxide particles from the milling balls and bowl. This process is continued until a total formulation volume of 30-40 mL is achieved. After the final formulation volume is achieved, the slurry is characterized by TGA to determine weight %. An aliquot of the formulation is diluted and characterized by dynamic light scattering (DLS) for particle size analysis.

In this example, after milling, the hexagonal tungsten trioxide nanostructures are coated onto a substrate using slot die coating. The die lip to substrate gap is from 80 microns, and the gap between the die halves is approximately 100 microns. The wet coating thickness is 37 microns. The concentration by mass of the solid nanostructures is approximately 10%, and the dry film thickness is approximately 600 nm to 1 micron. The coating speed is approximately 300 cm/min. The film was coated and dried at room temperature and 15% relative humidity.

The XRD pattern in FIG. 4a shows the size-reduced nanoparticles coated on an FTO coated glass substrate. The background XRD pattern from the FTO coated glass substrate shows a broad background signal at low angles, and at 2Θ of around 25° from the amorphous glass substrate, and a set of sharp peaks associated with the FTO (e.g., at 2Θ approximately 26.5°, 38°, 51.5°, 61.5° and 65.5°). The scan taken from the nanoparticle coated substrate shows the same broad peaks and FTO peaks from the substrate superimposed with the peaks from the hexagonal tungsten trioxide. The hexagonal tungsten trioxide peak positions in the coated sample are very similar to the peak positions taken from the sample directly after hydrothermal synthesis and washing; no additional peaks are seen indicating that the crystal structure was not altered during the milling process. Peak widths however have clearly broadened indicating that the particle size has been altered in comparison to the as-synthesized particle size. Analysis of the XRD pattern after size reduction indicates that the average crystallite size is approximately 150 nm.

Figure 4B:
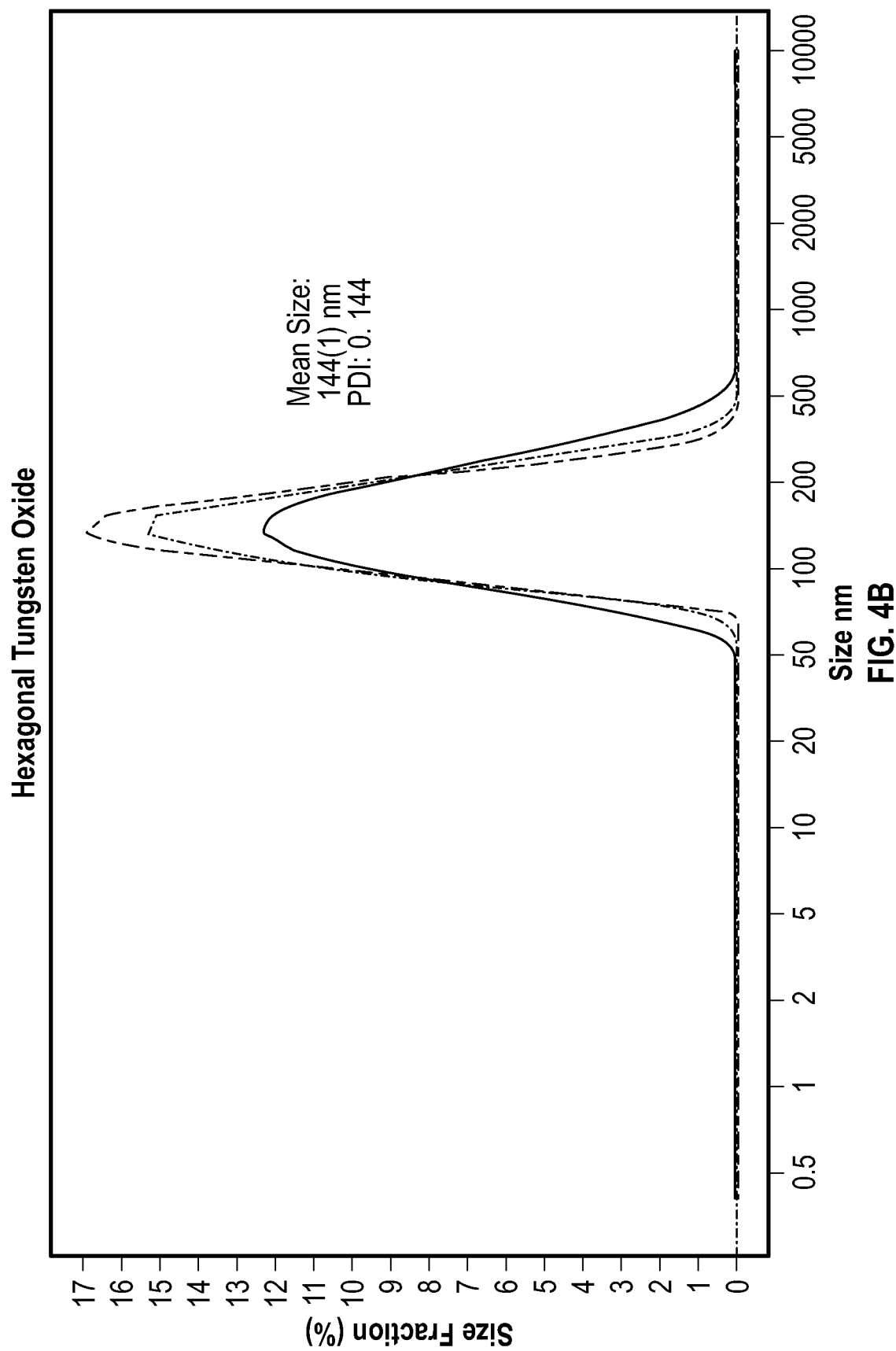
FIG. 4b illustrates a particle size distribution of hexagonal tungsten trioxide slurries after size-reduction by grinding.

An example of a hexagonal tungsten trioxide particle size distribution after milling, washing, and separating from the washing contaminants is shown in FIG. 4b. The mean particle size in this distribution is 144 nm, and the PDI is 0.144, as measured by DLS.

Example 4

Size Reduction of Pyrochlore Nanostructures

Figure 5A:
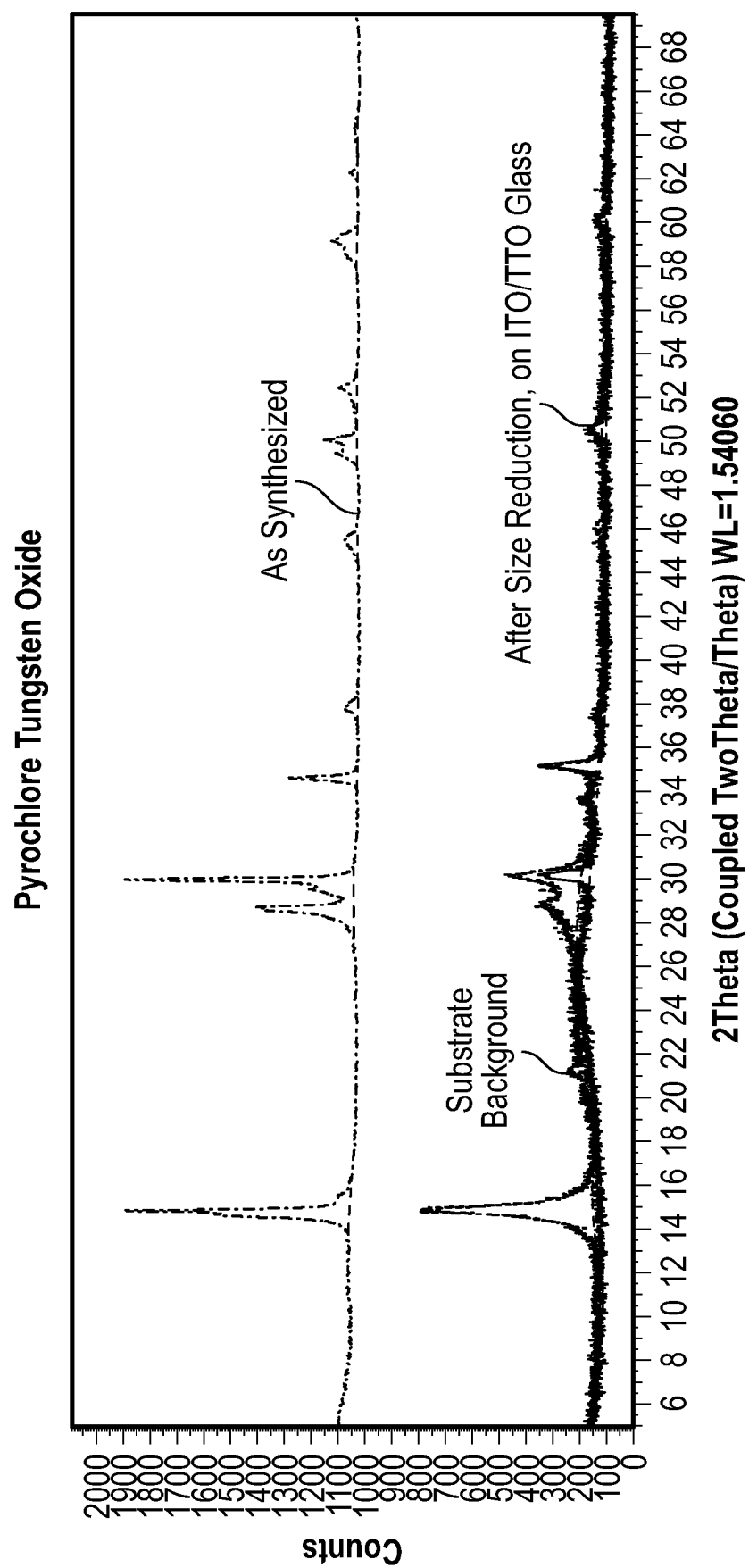
FIG. 5a illustrates an x-ray diffraction pattern for a pyrochlore tungsten oxide powder sample, produced by hydrothermal synthesis methods, and the same powder coated on an ITO/TTO coated glass substrate after size-reduction.

FIG. 5a shows an XRD pattern of the pyrochlore "starting material" (i.e. the as-synthesized material as described in Example 2), and the materials after size reducing and coating on a substrate. Samples were analyzed using a Bruker D8 Advance diffractometer employing CuKα radiation. Scans were made in Bragg-Brentano geometry using a Ni filter between 5-110° 2Θ with a step size of 0.01°. In this example, the dried powder (as described in Example 2) is size-reduced by grinding using an agitator bead mill. The mill has 80 mL bowls with $ZrO_2$ liners. The milling media are 0.1 mm diameter $ZrO_2$ balls. The primary particle size of the starting material is approximately between 5 and 500 nm, however, agglomerates from 1 to 20 microns are also observed.

6.4 (+/−0.1) g of pyrochlore material to be size-reduced by milling (e.g., product from 2 reaction batches using the synthetic procedure described in Example 2) is added to 30 mL of DI water and 100 (+/−1) g of 0.1 mm $ZrO_2$ balls, in the bowl of the mill. The milling cycle parameters are 500 RPM for 3 min, followed by 5-9 min of rest time (to allow the mill bowls to cool). The cycle is repeated 20 times, for a total of 1 hour active milling time. The formulation is then extracted from milling bowls and filtered to separate the milling media from the formulation.

Additional DI water is then added to the milling bowls and the mixture is shaken and sonicated to remove any remaining pyrochlore particles from the milling balls and bowl. This process is continued until a total formulation volume of 30-40 mL is achieved. After the final formulation volume is achieved, the slurry is characterized by TGA to determine weight %. An aliquot of the formulation is diluted and characterized by dynamic light scattering DLS for particle size analysis.

In this example, after milling, the pyrochlore nanostructures are coated onto a substrate using slot die coating. The die lip to substrate gap is from 80 microns, and the gap between the die halves is approximately 100 microns. The wet coating thickness is 37 microns. The concentration by mass of the solid nanostructures is approximately 10%, and the dry film thickness is approximately 600 nm to 1 micron. The coating speed is approximately 300 cm/min. The film was coated and dried at room temperature and 15% relative humidity.

The XRD pattern in FIG. 5a shows the size-reduced nanoparticles coated on an ITO/TTO coated glass substrate. The background XRD pattern from the ITO/TTO coated glass substrate shows a broad background signal at low angles, and at 2Θ of around 25° from the amorphous glass substrate, and a set of sharp peaks associated with the ITO/TTO (e.g., at 2Θ approximately 30.2°, 35.1°, 50.5°, and 60°). The scan taken from the nanoparticle coated substrate shows the same broad peaks and ITO/TTO peaks from the substrate superimposed with the peaks from the pyrochlore.

The pyrochlore peak positions in the coated sample are very similar to the peak positions taken from the sample directly after hydrothermal synthesis and washing; no additional peaks are seen indicating that the crystal structure was not altered during the milling process. Peak widths however have clearly broadened indicating that the particle size has been altered in comparison to the as-synthesized particle size. Analysis of the XRD pattern after size reduction indicates that the average crystallite size is approximately 56 nm.

An example of a pyrochlore particle size distribution after milling, washing, and separating from the washing contaminants is shown in FIG. 5b. The mean particle size in this distribution is 122 nm, and the PDI is 0.280, as measured by DLS.

Example 5

Electrochemical and Electrochromic Devices Incorporating Hexagonal Tungsten Trioxide Nanostructure Thin Film Cathodes Hexagonal tungsten trioxide nanostructures and inks are prepared by the methods described in Ex. 1 and Ex. 3.

Devices requiring optical characterization (i.e. devices producing the data shown in FIGS. 6a, 6b, 7a and 7b) were prepared by coating the hexagonal tungsten trioxide particles (without carbon black or PVDF) on 20×20 $mm^2$ FTO coated glass substrates. The electrochromic testing was performed in a propylene carbonate+1 M LiTFSi (Bis(trifluoromethane)sulfonimide lithium) solution with a Li counter electrode.

Figure 6A:
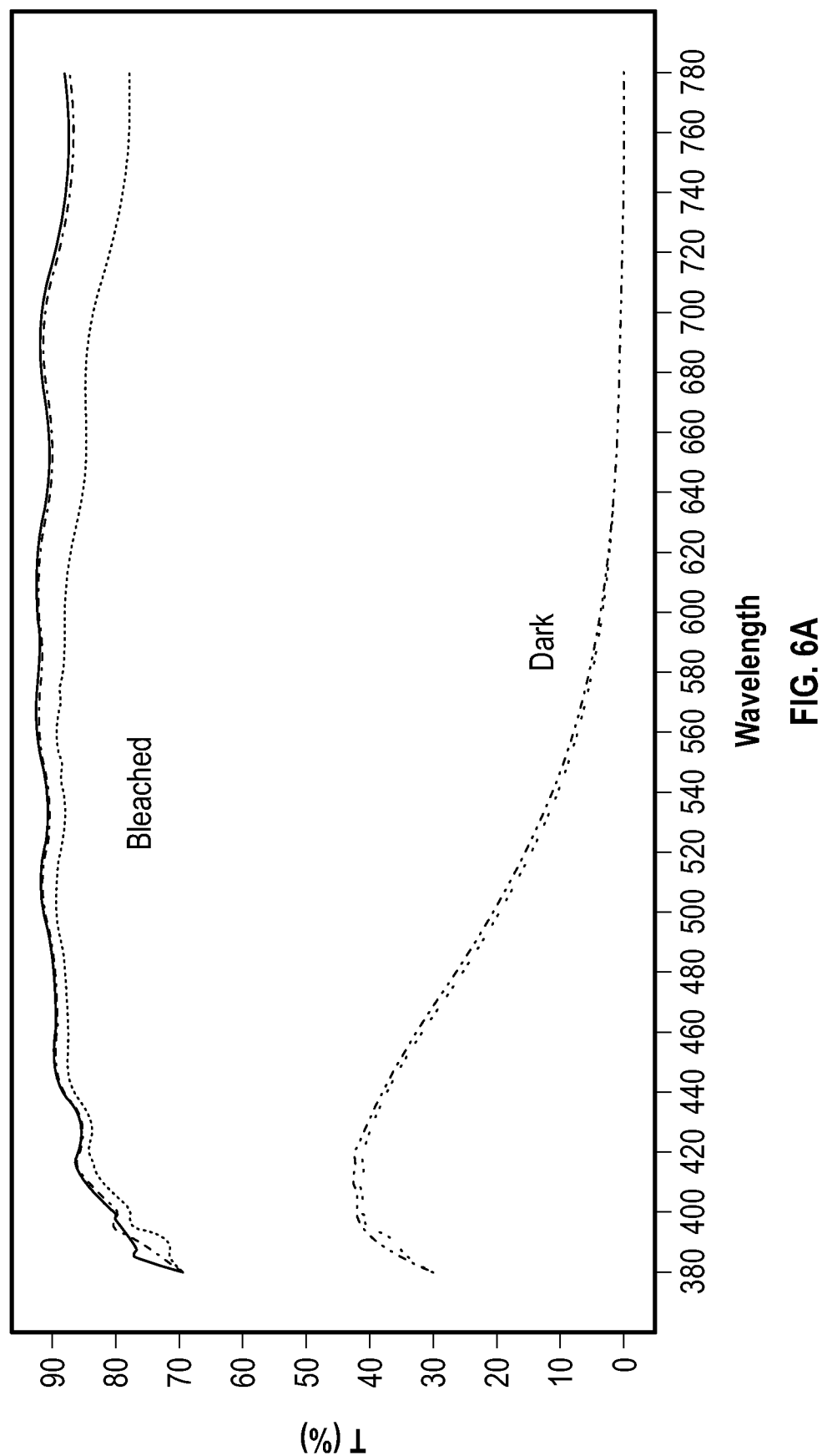
FIG. 6a illustrates the % transmission vs. wavelength spectra of a hexagonal tungsten oxide film in the bleached and darkened states.

FIG. 6a shows transmission spectra of a hexagonal tungsten trioxide electrochromic half-cell (or substrate) in the bleached and dark states. The transmission in the bleached state at a wavelength of 633 nm is 90.5% compared to 1.85% in the dark state. The transmission at 550 nm is 91.25% in the bleached state and 8.83% in the dark state.

FIG. 6b shows transmission spectra of a pyrochlore electrochromic half-cell (or substrate) in the bleached and dark states. The transmission in the bleached state at a wavelength of 633 nm is approximately 85% compared to approximately 4% in the dark state. The transmission at 550 nm is approximately 83% in the bleached state and approximately 12.5% in the dark state.

Figure 7A:
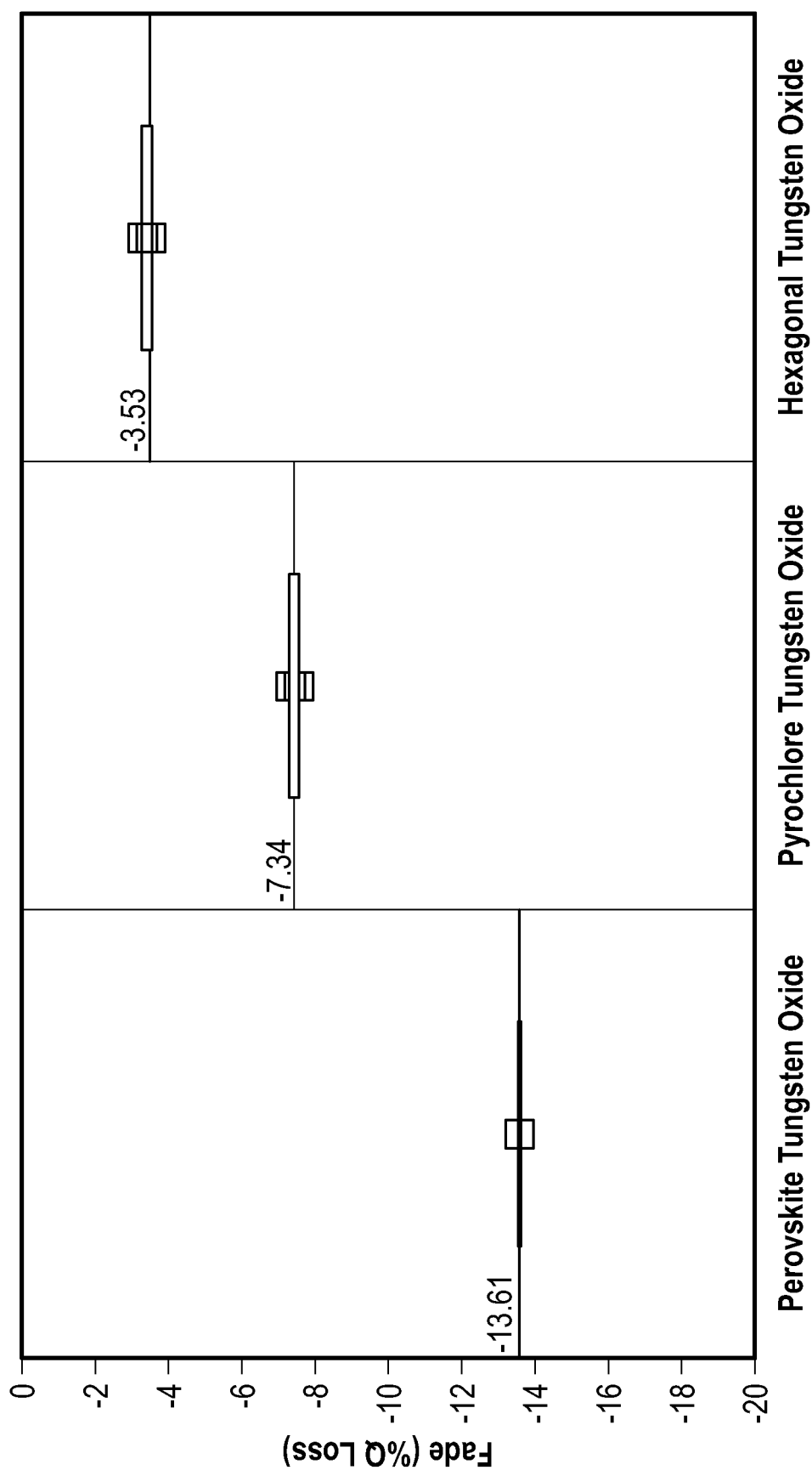
FIG. 7a illustrates the % fade (percent change in capacity between cycle 2 and cycle 23) for a perovskite $WO_3$ EC device compared to a hexagonal $WO_3$ EC device and a pyrochlore tungsten oxide EC device.

FIG. 7a shows the fade for a monoclinic perovskite $WO_3$ half-cell compared to a pyrochlore tungsten oxide half-cell and a hexagonal tungsten trioxide half-cell. The fade refers to the percent change in capacity between cycles 2 and 23. The fade for the monoclinic perovskite $WO_3$ device is about −13.6%, while the fade for the pyrochlore tungsten oxide half-cell is only −7.3% and fade for the hexagonal tungsten trioxide half-cell is only −3.5%. The fade is a measure of durability, and this data supports the improved durability of pyrochlore and hexagonal tungsten trioxide compared to monoclinic perovskite tungsten trioxide.

Figure 7B:
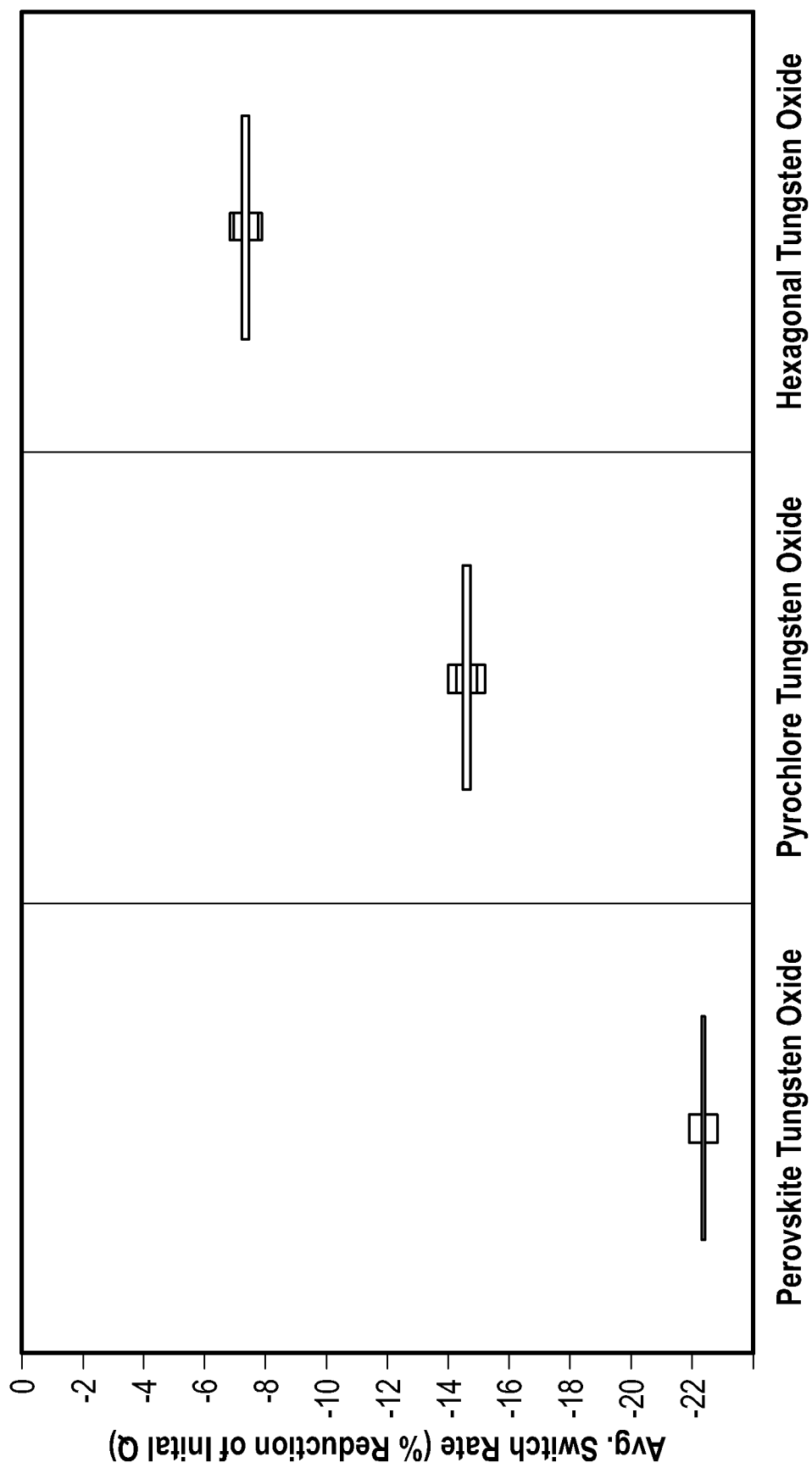
FIG. 7b illustrates the switching rate (reduction in capacity observed when the material is reduced at a current I equal to the initial Q (C)/120 s rather than at $25 \times 10^{-6}$ Amp) for a perovskite $WO_3$ EC device compared to a hexagonal $WO_3$ EC device and a pyrochlore tungsten oxide EC device. Initial Q is the capacity obtained when switching at $25 \times 10^{-6}$ Amps between bleached and darkened states.

FIG. 7b shows the switching rate for a monoclinic perovskite $WO_3$ half-cell compared to a pyrochlore tungsten oxide half-cell and a hexagonal tungsten trioxide half-cell. The switching rate refers to the reduction in capacity observed when the material is reduced at a current I equal to the initial Q (C)/120 s rather than at $25 \times 10^{-6}$ Amp. The switching rate is similar to the C-rate commonly used for batteries. The switching rate for the monoclinic $WO_3$ half-cell is about −22%, while the switching rate for the pyrochlore tungsten oxide is −15% and the switching rate for hexagonal tungsten trioxide device is only −7%. Not to be limited by theory, the switching rate is related to the ionic mobility of Li+ in the cathode, and this data supports the improved ionic mobility of Li+ in the pyrochlore and hexagonal tungsten trioxide compared to monoclinic perovskite tungsten trioxide.

The invention claimed is:

1. An electrochromic multi-layer stack comprising:
a substrate comprising a material with a melting point, a glass transition temperature, or a softening point less than 400° C.;
an electrically conductive layer on the substrate; and
an electrochromic cathode layer on the electrically conductive layer, wherein the electrochromic cathode layer comprises crystalline tungsten trioxide nanostructures, wherein the crystalline tungsten trioxide nanostructures have a mean size or a median size from 50 nm to 300 nm.

2. The electrochromic multi-layer stack of claim 1, wherein the crystalline tungsten trioxide nanostructures comprise hexagonal tungsten trioxide nanostructures, or substituted hexagonal tungsten trioxide nanostructures.

3. The electrochromic multi-layer stack of claim 1, wherein the tungsten trioxide nanostructures comprise crystalline pyrochlore tungsten trioxide nanostructures, or substituted pyrochlore tungsten trioxide nanostructures.

4. The electrochromic multi-layer stack of claim 1, wherein the crystalline tungsten trioxide nanostructures comprise monoclinic tungsten trioxide nanostructures, or substituted monoclinic tungsten trioxide nanostructures.

5. The electrochromic multi-layer stack of claim 1, wherein the crystalline tungsten trioxide nanostructures comprise tetragonal tungsten trioxide nanostructures, or substituted tetragonal tungsten trioxide nanostructures.

6. The electrochromic multi-layer stack of claim 1, wherein the crystalline tungsten trioxide nanostructures comprise $A_yW_{1-x}M_xO_{3\pm z} \cdot kH_2O$, wherein A is a monovalent species, M is a transition metal, x is from 0 to 1, y is from above 0 to 0.5, and z is from −0.5 to 0.5.

7. The electrochromic multi-layer stack of claim 1, wherein the electrochromic multi-layer stack is incorporated into an electrochromic device.

8. The electrochromic multi-layer stack of claim 1, wherein the electrically conductive layer is selected from: transparent conductive oxides, thin metallic coatings, networks of conductive nanoparticles, conductive metal nitrides, and composite conductors.

9. The electrochromic multi-layer stack of claim 1, wherein the substrate comprises one or more of polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates, and cellulose-based polymers.

10. A method of manufacturing an electrochromic multi-layer stack comprising:
forming an electrically conductive layer on a substrate, wherein the substrate comprises a material with a melting point, a glass transition temperature, or a softening point less than 400° C.; and
coating crystalline tungsten trioxide nanostructures onto the electrically conductive layer to produce a thin film, wherein the crystalline tungsten trioxide nanostructures have a mean size or a median size from 50 nm to 300 nm.

11. The method of claim 10, further comprising producing the crystalline tungsten trioxide nanostructures via hydrothermal synthesis before coating onto the electrically conductive layer.

12. The method of claim 10, wherein the crystalline tungsten trioxide nanostructures comprise hexagonal tungsten trioxide nanostructures, or substituted hexagonal tungsten trioxide nanostructures.

13. The method of claim 10, wherein the crystalline tungsten trioxide nanostructures comprise pyrochlore tungsten trioxide nanostructures, or substituted pyrochlore tungsten trioxide nanostructures.

14. The method of claim 10, wherein the crystalline tungsten trioxide nanostructures comprise crystalline monoclinic tungsten trioxide nanostructures, or substituted monoclinic tungsten trioxide nanostructures.

15. The method of claim 10, wherein the crystalline tungsten trioxide nanostructures comprise tetragonal tungsten trioxide nanostructures, or substituted tetragonal tungsten trioxide nanostructures.

16. The method of claim 10, wherein the crystalline tungsten trioxide nanostructures comprise $A_yW_{1-x}M_xO_{3\pm z} \cdot kH_2O$, wherein A is a monovalent species, M is a transition metal, x is from 0 to 1, y is from above 0 to 0.5, and z is from −0.5 to 0.5.

17. The method of claim 10, wherein the thin film is an electrochromic cathode layer in an electrochromic device.

18. The method of claim 10, wherein the electrically conductive layer is selected from: transparent conductive oxides, thin metallic coatings, networks of conductive nanoparticles, conductive metal nitrides, and composite conductors.

19. The method of claim 10, wherein the substrate comprises one or more of polycarbonates, polyacrylics, polyurethanes, urethane carbonate copolymers, polysulfones, polyimides, polyacrylates, polyethers, polyester, polyethylenes, polyalkenes, polyimides, polysulfides, polyvinylacetates, and cellulose-based polymers.

* * * * *